US012769229B2

(12) United States Patent
Ogawa et al.

(10) Patent No.: US 12,769,229 B2
(45) Date of Patent: Oct. 20, 2026

(54) IMAGE FORMING APPARATUS AND IMAGE FORMING SYSTEM HAVING DETECTION SIGNAL FOR TONER SUPPLY

(71) Applicant: CANON KABUSHIKI KAISHA, Tokyo (JP)

(72) Inventors: Tsuyoshi Ogawa, Tokyo (JP); Kengo Sakai, Kanagawa (JP); Shinichi Nishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 18/952,794

(22) Filed: Nov. 19, 2024

(65) Prior Publication Data

US 2025/0076786 A1 Mar. 6, 2025

Related U.S. Application Data

(63) Continuation of application No. 18/159,015, filed on Jan. 24, 2023, now Pat. No. 12,169,375, and a continuation of application No. PCT/JP2021/028132, filed on Jul. 29, 2021.

(30) Foreign Application Priority Data

Jul. 30, 2020 (JP) ................................ 2020-129008
Jul. 30, 2020 (JP) ................................ 2020-129009

(51) Int. Cl.
*G03G 15/08* (2006.01)
*G03G 15/00* (2006.01)

(52) U.S. Cl.
CPC ..... *G03G 15/0868* (2013.01); *G03G 15/0808* (2013.01); *G03G 15/5016* (2013.01); *G03G 2215/00628* (2013.01)

(58) Field of Classification Search
CPC .......... G03G 15/0808; G03G 15/0849; G03G 15/0856; G03G 15/0868; G03G 15/5016; G03G 2215/00628
USPC ...................................................... 399/53, 61
See application file for complete search history.

(56) References Cited

U.S. PATENT DOCUMENTS 11,752,773 B2 * 9/2023 Wong ................... B41J 2/17546
347/5
11,840,104 B2 * 12/2023 Watanabe ............ B41J 2/17513
11,846,894 B2 * 12/2023 Sato ..................... G03G 15/556

FOREIGN PATENT DOCUMENTS

JP H09258542 A 10/1997

* cited by examiner

*Primary Examiner* — Hoang X Ngo
(74) *Attorney, Agent, or Firm* — Canon U.S.A., Inc. IP Division

(57) ABSTRACT

An image forming apparatus includes a developing container, a detection portion detecting an amount of toner in the developing container, a display portion, and a control portion controlling the detection portion to execute a first detection and a second detection, wherein the display portion, in a case where the detection result of the first detection is greater than or equal to a first threshold, displays a first display and, in a case where the detection result is less than the first threshold, displays a second display different from the first display, and in a case where the detection result of the second detection is greater than or equal to a second threshold smaller than the first threshold, displays the first display and, in a case where the detection result is less than the second threshold, displays the second display.

12 Claims, 22 Drawing Sheets

NEAR OUT

LOW

MID

FULL

IMAGE FORMING APPARATUS AND IMAGE FORMING SYSTEM HAVING DETECTION SIGNAL FOR TONER SUPPLY

CROSS-REFERENCE TO RELATED APPLICATIONS

This application is the Continuation of U.S. patent application Ser. No. 18/159,015 filed Jan. 24, 2023, which is the Continuation of International Patent Application No. PCT/JP2021/028132, filed Jul. 29, 2021, which claims the benefit of Japanese Patent Applications No. 2020-129008, filed Jul. 30, 2020, and No. 2020-129009, filed Jul. 30, 2020, all of which are hereby incorporated by reference herein in their entirety.

BACKGROUND OF THE INVENTION

Field of the Invention

The present invention relates to an image forming apparatus that forms an image on a recording material, and an image forming system.

Background Art

Generally, an electrophotographic image forming apparatus transfers a toner image formed on a surface of a photosensitive drum to a transfer material as a transfer medium, thereby forming an image. Then, as a method for supplying a developer, for example, a process cartridge method and a toner supply method are known. The process cartridge method is a method for integrating a photosensitive drum and a developing container into a process cartridge and, if a developer runs out, replacing the process cartridge with a new process cartridge.

On the other hand, the toner supply method is a method for, if toner runs out, newly supplying toner to a developing container. Japanese Patent Application Laid-Open No. 2015-148768 discusses a configuration of a toner cartridge as a toner supply container that is attached to a process cartridge attachable to and detachable from an image forming apparatus and that supplies toner.

In recent years, an image forming apparatus is required to be used in various ways such as the process cartridge method and the toner supply method by a user.

CITATION LIST

Patent Literature

PTL 1: Japanese Patent Application Laid-Open No. 2015-148768

SUMMARY OF THE INVENTION

According to an aspect of the present invention, an image forming apparatus that performs image formation for forming a toner image on a recording material includes a photosensitive drum, a developing container configured to store toner, the developing container provided with a replenishment opening for toner supply from outside of the image forming apparatus, a developing roller configured to supply the toner stored in the developing container to the photosensitive drum, a detection portion configured to detect an amount of the toner stored in the developing container, a display portion configured to perform display depending on a detection result of the detection portion, and a control portion configured to control the display portion, wherein the control portion controls the detection portion to execute a first detection to reflect a decrease in the amount of the toner in the developing container due to the image formation on a display of the display portion, and a second detection to reflect an increase in the amount of the toner in the developing container due to the toner supply on the display of the display portion, wherein the display portion, in a case where the detection result of the first detection is greater than or equal to a first threshold, displays a first display and, in a case where the detection result of the first detection is less than the first threshold, displays a second display different from the first display, and in a case where the detection result of the second detection is greater than or equal to a second threshold, displays the first display and, in a case where the detection result of the second detection is less than the second threshold, displays the second display, and wherein the second threshold is smaller than the first threshold.

Further features of the present invention will become apparent from the following description of exemplary embodiments with reference to the attached drawings.

DESCRIPTION OF THE EMBODIMENTS

Exemplary embodiments for carrying out the present invention will be described below with reference to the drawings. However, the dimensions, the materials, the shapes, and the relative arrangement of components described in the following exemplary embodiments should be appropriately changed depending on the configuration of an apparatus to which the invention is applied, or various conditions, and are not intended to limit the scope of the invention to the following exemplary embodiments.

First Exemplary Embodiment

Figure 1A:
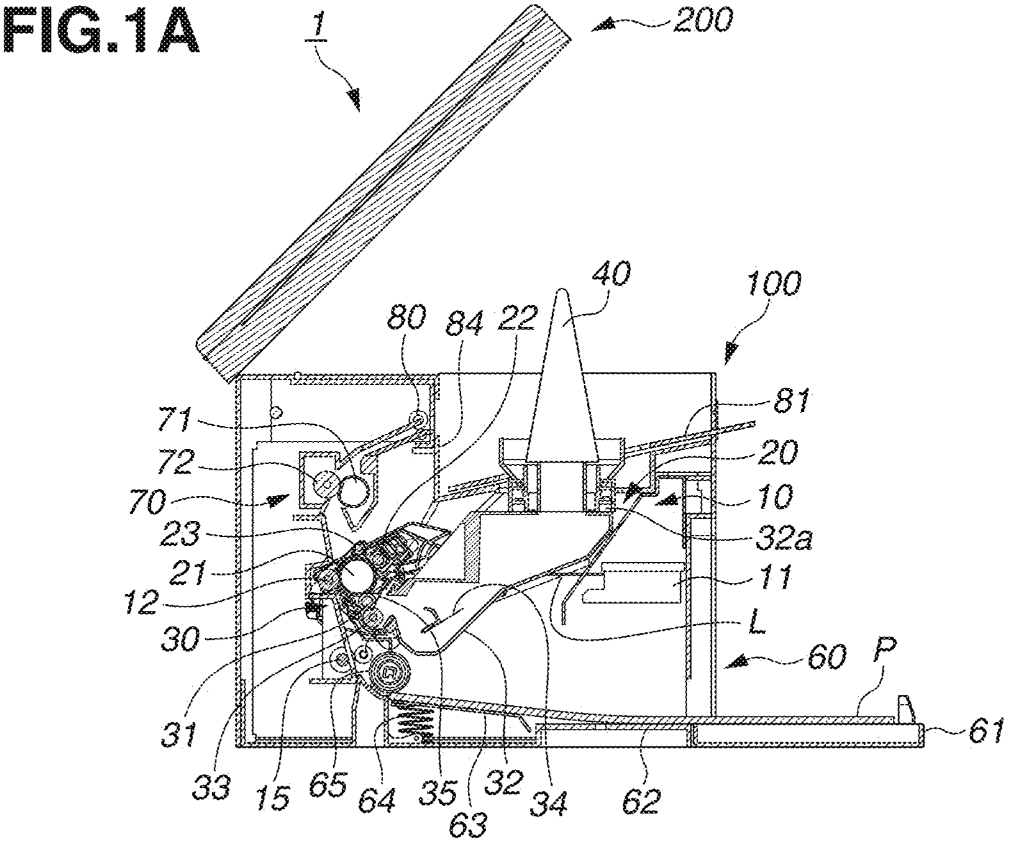
FIG. 1A is a cross-sectional view illustrating an image forming apparatus according to a first exemplary embodiment.

FIG. 1A is a schematic diagram illustrating a configuration of an image forming apparatus 1 according to a first exemplary embodiment. The image forming apparatus 1 is a monochrome printer that forms an image on a recording material based on image information input from an external device. The recording material may be a sheet material made of a different material, e.g., paper such as plain paper and thick paper, a plastic film such as an overhead projector sheet, sheets having special shapes such as an envelope and index paper, and cloth.

[Overall Configuration]

Figure 1B:
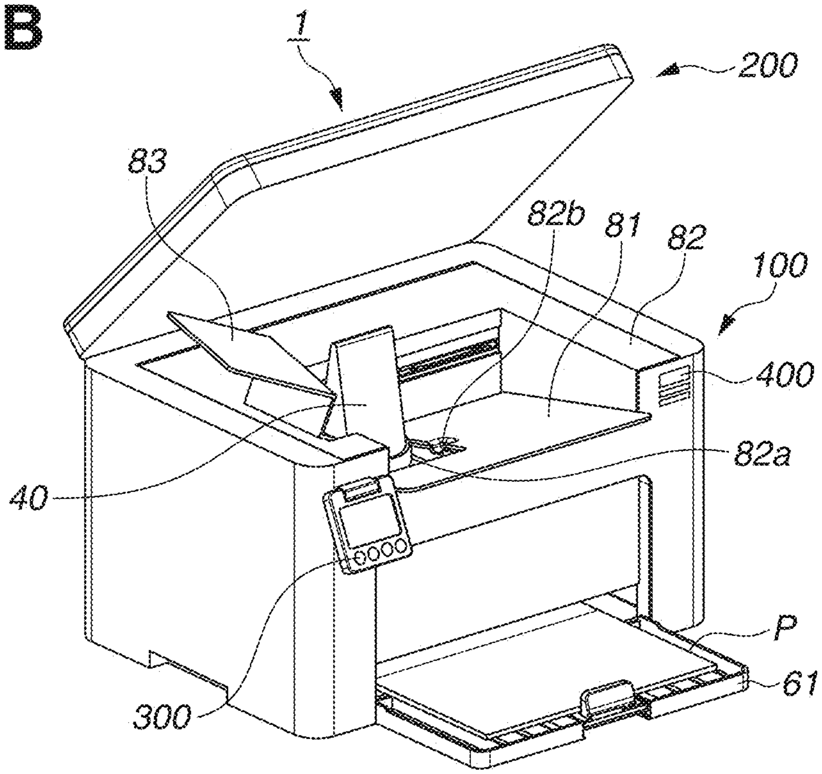
FIG. 1B is a perspective view illustrating the image forming apparatus.

As illustrated in FIGS. 1A and 1B, the image forming apparatus 1 includes a printer main body 100 as an apparatus main body, a reading device 200 openably and closably supported by the printer main body 100, and an operation portion 300 attached to an exterior surface of the printer main body 100. The printer main body 100 includes an image forming portion 10 that forms a toner image on a recording material, a feeding portion 60 that feeds the recording material to the image forming portion 10, a fixing portion 70 that fixes the toner image formed by the image forming portion 10 to the recording material, and a discharge roller pair 80.

Figure 6A:
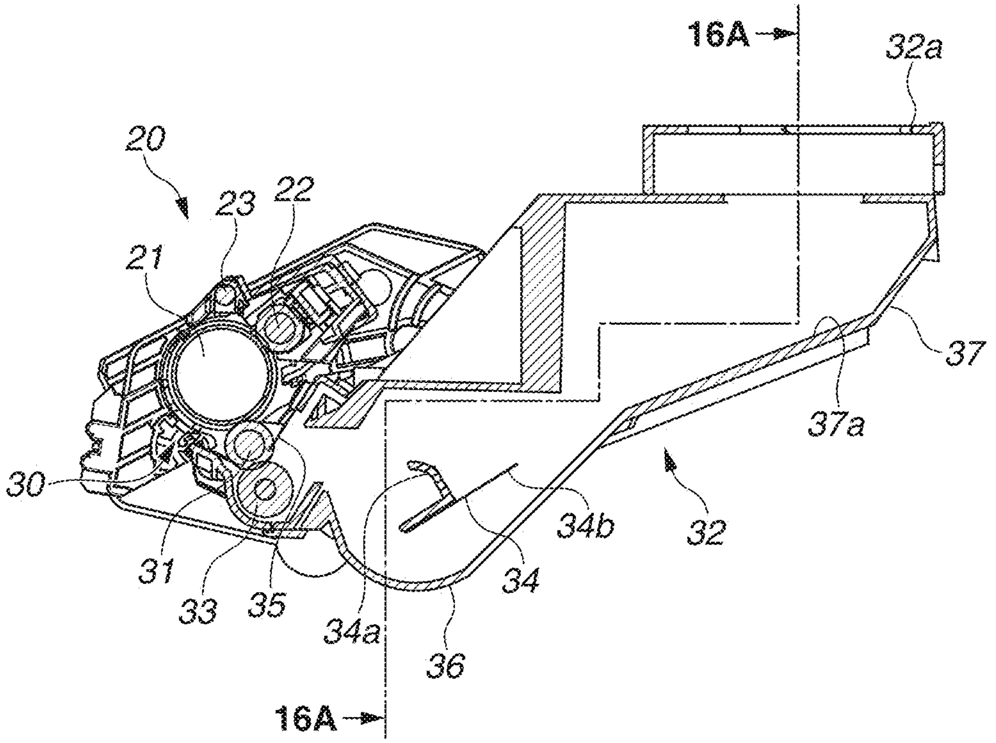
FIG. 6A is a 6A-6A cross-sectional view in FIG. 5B.
Figure 6B:
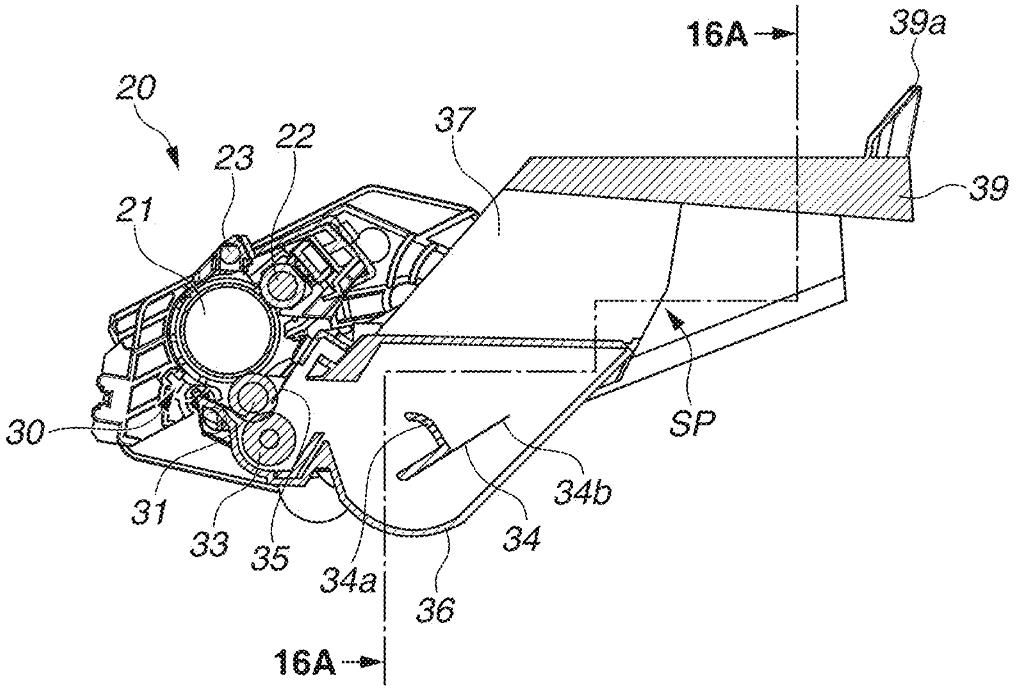
FIG. 6B is a 6B-6B cross-sectional view in FIG. 5B.

The image forming portion 10 includes a scanner unit 11, an electrophotographic process cartridge 20, and a transfer roller 12 that transfers a toner image formed on a photosensitive drum 21 of the process cartridge 20 to a recording material. As illustrated in FIGS. 6A and 6B, the process cartridge 20 includes the photosensitive drum 21 and a charging roller 22, a pre-exposure device 23, and a developing device 30 including a developing roller 31 that are placed around the photosensitive drum 21.

The photosensitive drum 21 is a photosensitive member formed into a cylindrical shape. The photosensitive drum 21 according to the present exemplary embodiment includes a photosensitive layer formed of a negatively charged organic photosensitive member on a drum-like base formed of aluminum. The photosensitive drum 21 as an image bearing member is rotationally driven at a predetermined process speed in a predetermined direction (a clockwise direction in FIGS. 6A and 6B) by a motor.

The charging roller 22 comes into contact with the photosensitive drum 21 with a predetermined pressure contact force, thereby forming a charging portion. A desired charging voltage is applied to the charging roller 22 by a charging high-voltage power supply, thereby a surface of the photosensitive drum 21 is uniformly charged to a predetermined potential. In the present exemplary embodiment, the photosensitive drum 21 is charged to a negative polarity by the charging roller 22. To cause the charging portion to perform stable discharge, the pre-exposure device 23 removes charge from the surface potential of the photosensitive drum 21 before the photosensitive drum 21 enters the charging portion.

The scanner unit 11 as an exposure means emits laser light corresponding to image information input from the external device or the reading device 200 to the photosensitive drum 21 using a polygon mirror, thereby scanning and exposing the surface of the photosensitive drum 21. The exposure forms an electrostatic latent image according to the image information on the surface of the photosensitive drum 21. The scanner unit 11 is not limited to a laser scanner device, and for example, a light-emitting diode (LED) exposure device including an LED array in which a plurality of LEDs is arranged in the longitudinal direction of the photosensitive drum 21 may be employed.

The developing device 30 includes the developing roller 31 as a developer bearing member that bears a developer, a developing container 32 as a frame member of the developing device 30, and a supply roller 33 capable of supplying a developer to the developing roller 31. The developing roller 31 and the supply roller 33 are rotatably supported by the developing container 32. The developing roller 31 is placed in an open portion of the developing container 32 to be opposed to the photosensitive drum 21. The supply roller 33 is in contact with the developing roller 31 in a rotatable manner, and toner as a developer stored in the developing container 32 is applied to a surface of the developing roller 31 by the supply roller 33. The supply roller 33 is not necessarily required as long as a configuration is employed in which toner can be sufficiently supplied to the developing roller 31.

The developing device 30 according to the present exemplary embodiment uses a contact developing method as a developing method. More specifically, a toner layer borne on the developing roller 31 comes into contact with the photosensitive drum 21 in a developing portion (a developing area) where the photosensitive drum 21 and the developing roller 31 are opposed to each other. A developing voltage is applied to the developing roller 31 by a developing high-voltage power supply. At the developing voltage, toner borne on the developing roller 31 is transferred from the developing roller 31 to the surface of the drum according to the potential distribution of the surface of the photosensitive drum 21, thereby an electrostatic latent image is developed into a toner image. In the present exemplary embodiment, a reversal developing method is employed. More specifically, toner is attached to the surface area of the photosensitive drum 21 where the amount of charge is attenuated by the surface of the photosensitive drum 21 being charged in a charging step and then exposed in an exposure step, thereby forming a toner image.

In the present exemplary embodiment, toner of which the grain size is 6 μm and the normal charge polarity is a negative polarity is used. As the toner according to the present exemplary embodiment, as an example, polymerized toner generated by a polymerization method is employed. The toner according to the present exemplary embodiment is what is called a nonmagnetic one-component developer, which is toner that does not contain a magnetic component and is borne on the developing roller 31 mainly by an intermolecular force or an electrostatic force (an image force). However, a one-component developer containing a magnetic component may be used. There is a case where a one-component developer includes an additive (e.g., wax or silica microparticles) for adjusting the fluidity or the charging performance of toner in addition to toner particles. Alternatively, a two-component developer composed of nonmagnetic toner and a magnetic carrier may be used as a developer. In a case where a magnetic developer is used, for example, a cylindrical developing sleeve in which a magnet is placed is used as the developer bearing member.

Within the developing container 32, an agitation member 34 as an agitation means is provided. The agitation member 34 rotationally moves by being driven by a motor M1 (see FIG. 12), thereby agitating toner in the developing container 32 and feeding toner to the developing roller 31 and the supply roller 33. The agitation member 34 has the function of circulating toner that is not used in development and is scraped off from the developing roller 31 in the developing container and uniformizing toner in the developing container. The agitation member 34 is not limited to a form in which the agitation member 34 rotationally moves. For example, an agitation member in a form in which the agitation member swings may be employed.

In the open portion of the developing container 32 where the developing roller 31 is placed, a developing blade 35 that regulates an amount of toner borne on the developing roller 31 is placed. Toner supplied to the surface of the developing roller 31 is uniformly formed into a thin layer by passing through a portion opposed to the developing blade 35 with the rotation of the developing roller 31 and is also charged to a negative polarity by frictional charging.

As illustrated in FIGS. 1A and 1B, the feeding portion 60 includes a front door 61 openably and closably supported by the printer main body 100, a tray portion 62, an intermediate plate 63, a tray spring 64, and a pickup roller 65. The tray portion 62 forms a bottom surface of a recording material storage space that appears when the front door 61 is opened. The intermediate plate 63 is supported by the tray portion 62 so that the intermediate plate 63 can be lifted and lowered. The tray spring 64 urges the intermediate plate 63 upward and presses a recording material P stacked in the intermediate plate 63 against the pickup roller 65. The front door 61 blocks the recording material storage space in the state where the front door 61 is closed relative to the printer main body 100. The front door 61 supports the recording material P together with the tray portion 62 and the intermediate plate 63 in the state where the front door 61 is opened relative to the printer main body 100.

The fixing portion 70 uses a heat fixing method for performing the process of fixing an image by heating and fusing toner on a recording material. The fixing portion 70 includes a fixing film 71, a fixing heater such as a ceramic heater that heats the fixing film 71, a thermistor that measures the temperature of the fixing heater, and a pressure roller 72 that comes into pressure contact with the fixing film 71.

Next, an image forming operation of the image forming apparatus 1 is described. If an image forming command is input to the image forming apparatus 1, the image forming portion 10 starts an image forming process based on image information input from an external computer connected to the image forming apparatus 1 or the reading device 200. The scanner unit 11 emits laser light to the photosensitive drum 21 based on the input image information. At this time, the photosensitive drum 21 is charged in advance by the charging roller 22. The photosensitive drum 21 is irradiated with the laser light, thereby an electrostatic latent image is formed on the photosensitive drum 21. Then, the developing roller 31 develops the electrostatic latent image, thereby forming a toner image on the photosensitive drum 21.

In parallel with the above image forming process, the pickup roller 65 of the feeding portion 60 sends out the recording material P supported by the front door 61, the tray portion 62, and the intermediate plate 63. The recording material P is fed by the pickup roller 65 to a registration roller pair 15 and hits a nip of the registration roller pair 15, thereby the skew of the recording material P is corrected. Then, the registration roller pair 15 is driven in synchronization with a transfer timing of the toner image and conveys the recording material P to a transfer nip formed by the transfer roller 12 and the photosensitive drum 21.

A transfer voltage is applied to the transfer roller 12 as a transfer means by a transfer high-voltage power supply, and the toner image borne on the photosensitive drum 21 is transferred to the recording material P conveyed by the registration roller pair 15. The recording material P to which the toner image is transferred is conveyed to the fixing portion 70, and when the recording material P passes through a nip portion between the fixing film 71 and the pressure roller 72 of the fixing portion 70, the toner image is heated and pressurized. This fuses toner particles, and then, the toner particles are firmly fixed, thereby the toner image is fixed to the recording material P. The recording material P having passed through the fixing portion 70 is discharged to the outside of the image forming apparatus 1 (the outside of the apparatus) by the discharge roller pair 80 as a discharge means and stacked on a discharge tray 81 as a stacking portion formed in an upper portion of the printer main body 100.

The discharge tray 81 slopes upward downstream in the discharge direction of the recording material. The recording material discharged to the discharge tray 81 slides down the discharge tray 81, thereby the rear end of the recording material is aligned by a regulation surface 84.

Figure 4A:
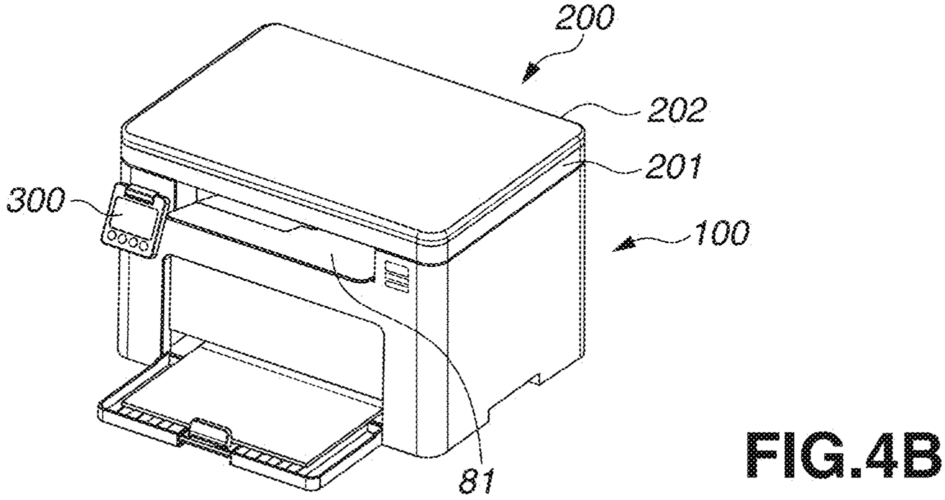
FIG. 4A is a perspective view illustrating the image forming apparatus in a state where a pressure plate of a reading device is closed.
Figure 4B:
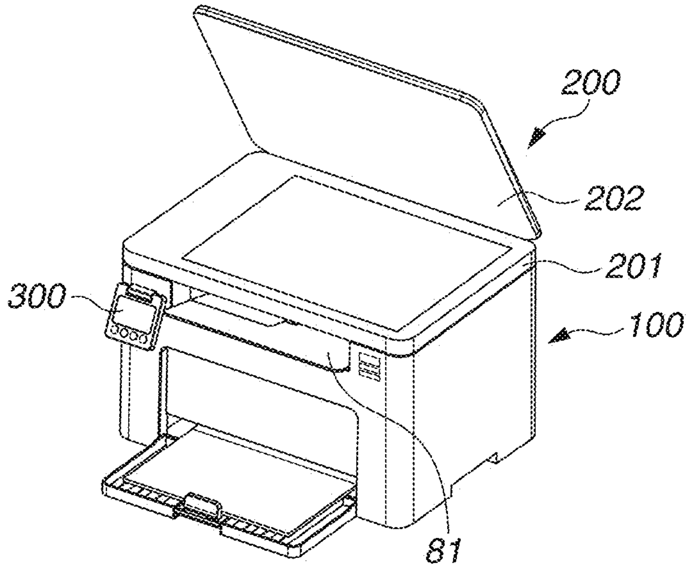
FIG. 4B is a perspective view illustrating the image forming apparatus in a state where the pressure plate is opened.

As illustrated in FIGS. 4A and 4B, the reading device 200 includes a reading unit 201 having a reading portion (not illustrated) built-in, and a pressure plate 202 openably and closably supported by the reading unit 201. On an upper surface of the reading unit 201, a document platen glass 203 is provided which transmits light emitted from the reading portion and on which a document is placed.

To cause the reading device 200 to read an image of a document, a user places the document on the document platen glass 203 in a state where the pressure plate 202 is opened. Then, the user prevents a positional shift in the document on the document platen glass 203 by closing the pressure plate 202 and outputs a reading command to the image forming apparatus 1, for example, by operating the operation portion 300. If a reading operation is started, the reading portion in the reading unit 201 reciprocates in a sub-scanning direction, i.e., a left-right direction in a state where the user faces the operation portion 300 of the image forming apparatus 1. The reading portion emits light to the document using a light-emitting portion, receives the light reflected by the document using a light-receiving portion, and photoelectrically converts the light, thereby reading an image of the document. In the following description, a front-back direction, a left-right direction, and an up-down direction are defined based on the state where the user faces the operation portion 300.

Figure 2A:
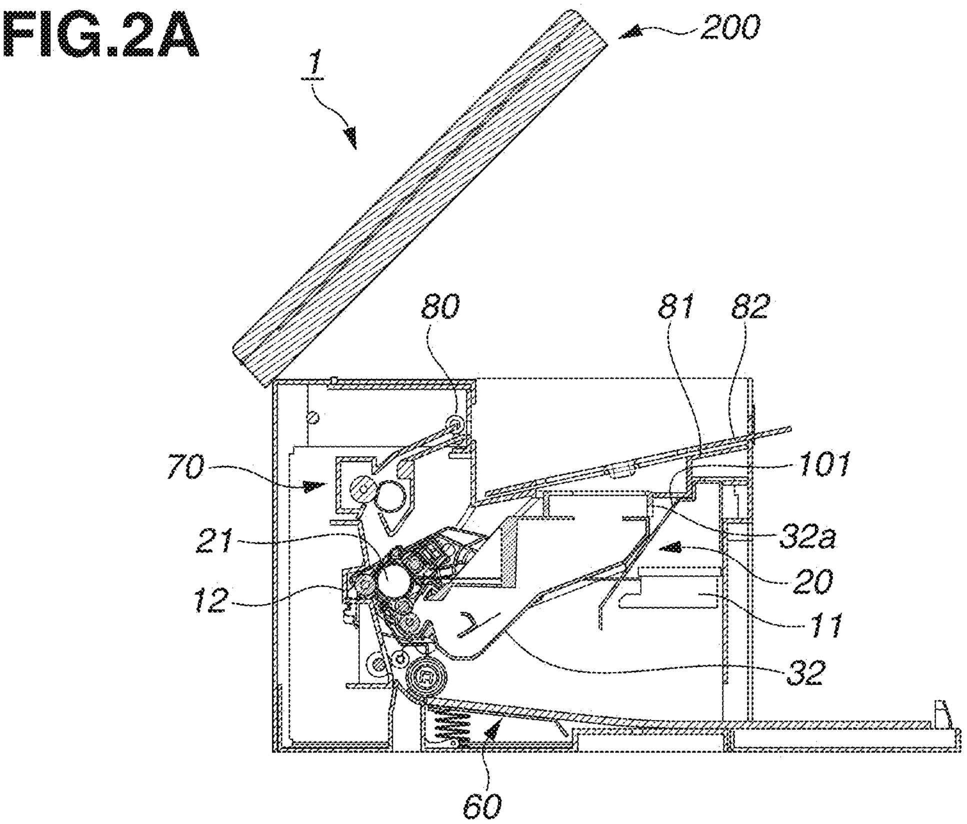
FIG. 2A is a cross-sectional view illustrating the image forming apparatus.
Figure 2B:
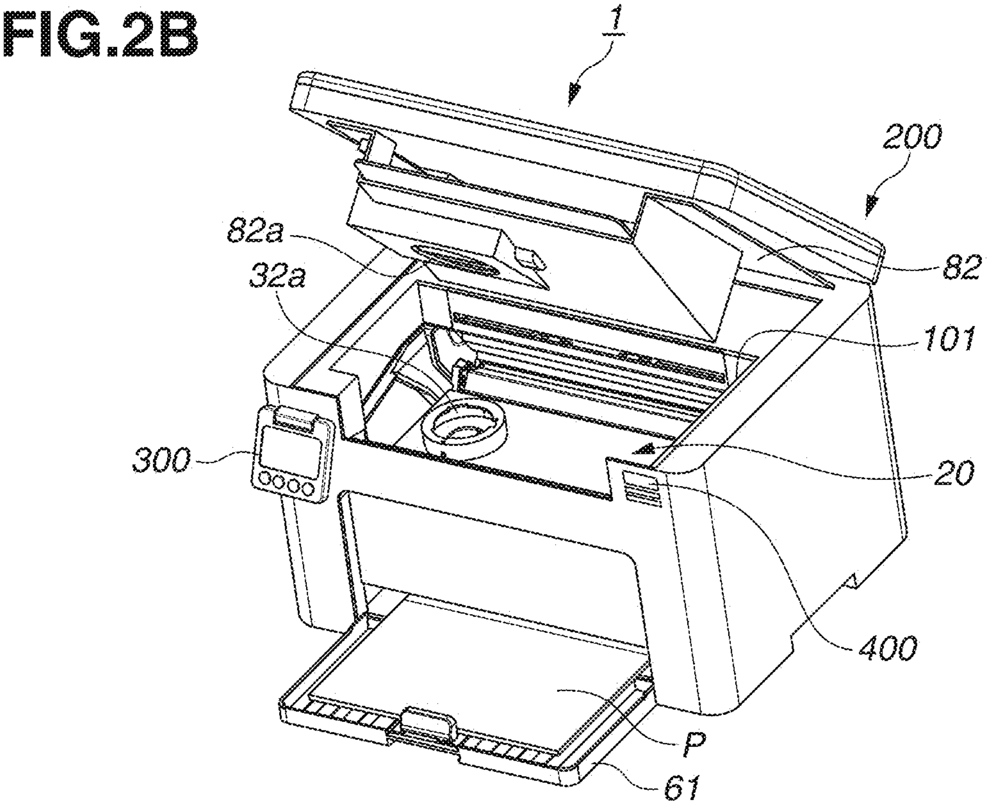
FIG. 2B is a perspective view illustrating the image forming apparatus in a state where a top cover is opened.
Figure 3:
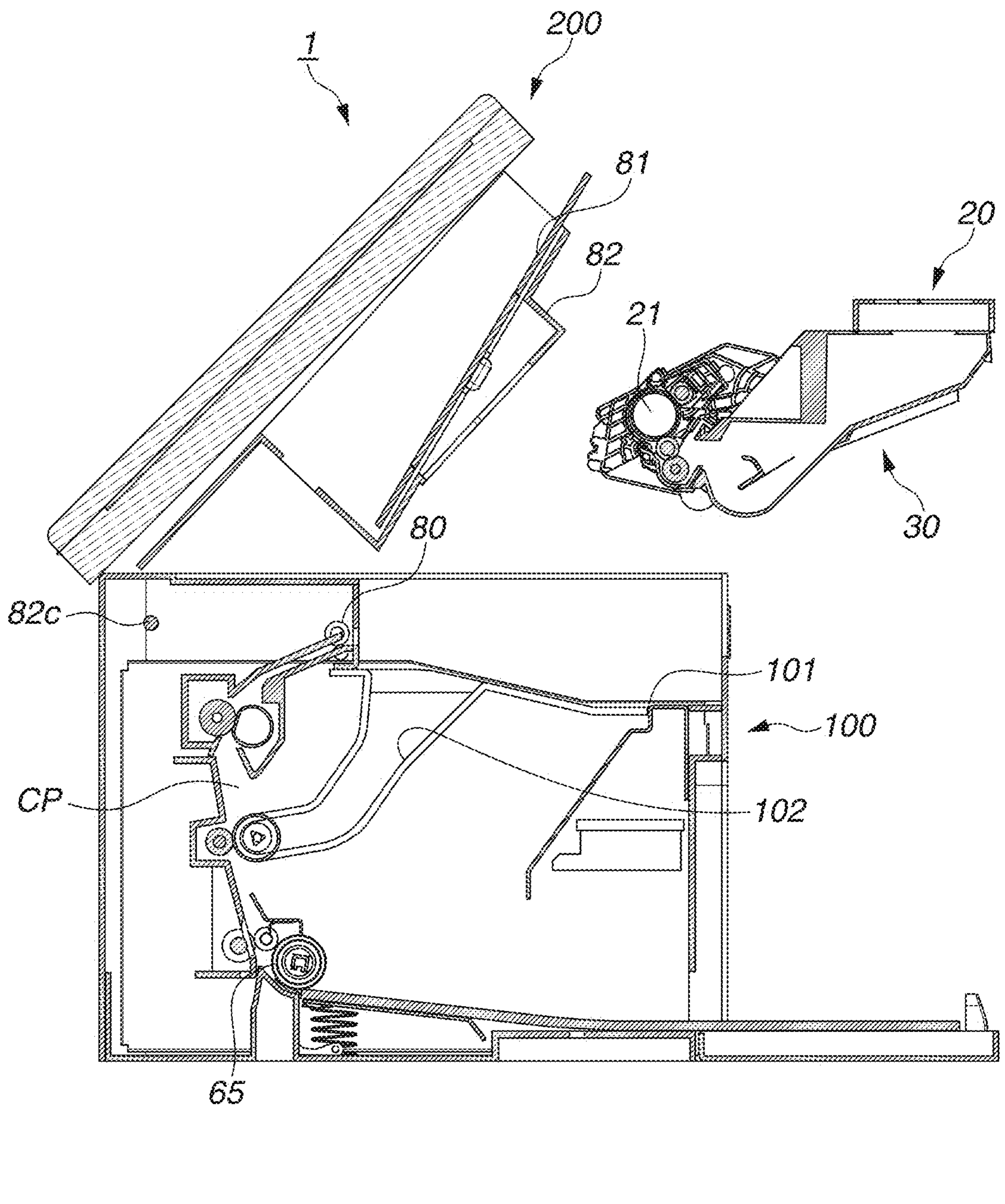
FIG. 3 is a cross-sectional view illustrating the image forming apparatus in a state where a process cartridge is detached.

As illustrated in FIGS. 2B and 3, in the upper portion of the printer main body 100, a first open portion 101 open upward is formed. The first open portion 101 is covered by a top cover 82. The top cover 82 as a stacking tray is supported openably and closably relative to the printer main body 100 about a rotational movement shaft 82*c* extending in the left-right direction. On an upper surface of the top cover 82, the discharge tray 81 as a stacking surface is formed. The top cover 82 is opened from the near side to the far side in a state where the reading device 200 is opened relative to the printer main body 100. The reading device 200 and the top cover 82 may be configured to be held in an opened state and a closed state by a holding mechanism such as a hinge mechanism.

For example, if the recording material causes a jam such as a paper jam in the conveying path CP through which the recording material fed by the pickup roller 65 passes, the user opens the top cover 82 together with the reading device 200. Then, the user accesses the process cartridge 20 through the first open portion 101 exposed when the top cover 82 is opened and pulls out the process cartridge 20 along a cartridge guide 102. The cartridge guide 102 guides the process cartridge 20 by sliding the process cartridge 20 in contact with a protruding portion 21*a* (see FIG. 5A) provided in an end portion in the axial direction of the photosensitive drum 21 of the process cartridge 20.

Then, the process cartridge 20 is pulled out through the first open portion 101 to the outside, thereby a space that enables the user to put his or her hand in the conveying path CP is formed. The user puts his or her hand inside the printer main body 100 through the first open portion 101 and accesses the recording material jamming the conveying path CP and thereby can handle the jamming recording material.

Figure 4C:
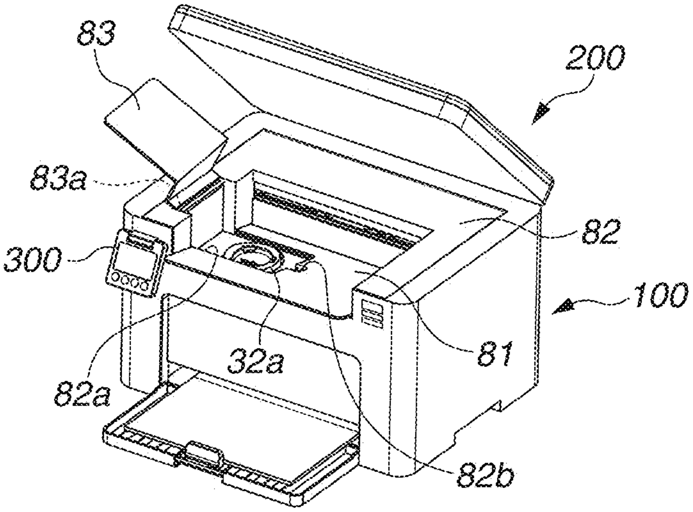
FIG. 4C is a perspective view illustrating the image forming apparatus in a state where the reading device is opened.

In the present exemplary embodiment, as illustrated in FIGS. 1B and 4C, an opening/closing member 83 is openably and closably provided in the top cover 82. In the discharge tray 81 of the top cover 82, a second open portion 82*a* as an open portion open upward is formed. The opening/closing member 83 is configured to be movable between a closed position where a replenishment opening 32*a* is covered so that a toner pack 40 cannot be attached to the developing container 32, and an opened position where the replenishment opening 32*a* is exposed so that the toner pack 40 can be attached to the developing container 32. The opening/closing member 83 functions as a part of the discharge tray 81 at the closed position. The opening/closing member 83 and the second open portion 82*a* are formed on the left side of the discharge tray 81. The opening/closing member 83 is openably and closably supported by the top cover 82 about a rotational movement shaft 83*a* extending in the front-back direction and is opened in the left direction by the user hooking his or her finger in a groove portion 82*b* provided in the top cover 82. The opening/closing member 83 is formed into a substantially L-shape along the shape of the top cover 82.

The second open portion 82*a* of the discharge tray 81 is open so that the replenishment opening 32*a* for supplying toner that is formed in an upper portion of the developing container 32 is exposed. The opening/closing member 83 is opened, whereby the user can access the replenishment opening 32*a* without opening the top cover 82. In the present exemplary embodiment, a method is employed in which the user supplies toner from the toner pack 40 (see FIGS. 1A and 1B) filled with replenishment toner to the developing device 30 in a state where the developing device 30 remains attached to the image forming apparatus 1 (a direct supply method). Thus, in a case where a remaining amount of toner in the process cartridge 20 is small, work of taking the process cartridge 20 out of the printer main body 100 and replacing the process cartridge 20 with a new process cartridge is unnecessary. Thus, it is possible to improve usability. Further, the method enables toner to be supplied to the developing container 32 less expensively than by a method where the entire process cartridge 20 is replaced. The direct supply method, as compared to a case where only the developing device 30 of the process cartridge 20 is replaced, can reduce costs because it is not necessary to replace various rollers and gears. The image forming apparatus 1 and the toner pack 40 are included in an image forming system.

[Collection of Transfer Residual Toner]

In the present exemplary embodiment, a cleanerless configuration is employed in which transfer residual toner that is not transferred to the recording material P and remains on the photosensitive drum 21 is collected in the developing device 30 and reused. The transfer residual toner is removed by the following step. The transfer residual toner includes a mix of toner charged to a positive polarity and toner that is charged to a negative polarity but does not have sufficient charges. The pre-exposure device 23 removes charge from the photosensitive drum 21 after the transfer, and the charging roller 22 uniformly discharges, thereby charging the transfer residual toner to the negative polarity again. The transfer residual toner charged to the negative polarity again by the charging portion reaches the developing portion with the rotation of the photosensitive drum 21. Then, the surface area of the photosensitive drum 21 having passed through the charging portion is exposed by the scanner unit 11, and an electrostatic latent image is written to the surface area in the state where the transfer residual toner remains attached to the surface.

Behavior of the transfer residual toner reaching the developing portion is described separately for an exposed portion and a non-exposed portion of the photosensitive drum 21. Transfer residual toner attached to the non-exposed portion of the photosensitive drum 21 is transferred to the developing roller 31 by a potential difference between the potential of the non-exposed portion (a dark portion potential) of the photosensitive drum 21 and the developing voltage in the developing portion and collected in the developing container 32. This is because, on the assumption that the normal charge polarity of toner is a negative polarity, the developing voltage applied to the developing roller 31 has a positive polarity relative to the potential of the non-exposed portion. The toner collected in the developing container 32 is agitated and dispersed with toner in the developing container by the agitation member 34 and is borne on the developing roller 31, thereby being used in a developing step again.

On the other hand, transfer residual toner attached to the exposed portion of the photosensitive drum 21 is not transferred from the photosensitive drum 21 to the developing roller 31 in the developing portion and remains on the surface of the drum. This is because, on the assumption that the normal charge polarity of toner is a negative polarity, the developing voltage applied to the developing roller 31 has a more negative polarity than the potential of the exposed portion (a light portion potential). The transfer residual toner remaining on the surface of the drum is borne on the photosensitive drum 21 and moved to a transfer portion together with other toner to be transferred from the developing roller 31 to the exposed portion, and is transferred to the recording material P in the transfer portion.

As described above, in the present exemplary embodiment, the cleanerless configuration is employed in which transfer residual toner is collected in the developing device 30 and reused. Alternatively, a conventionally known configuration may be employed in which transfer residual toner is collected using a cleaning blade that comes into contact with the photosensitive drum 21. In this case, the transfer residual toner collected by the cleaning blade is collected in a collection container installed separately from the developing device 30. With the cleanerless configuration, however, an installation space for the collection container that collects the transfer residual toner is unnecessary, and it is possible to further miniaturize the image forming apparatus 1. It is also possible to reduce printing costs by reuse of the transfer residual toner.

[Configurations of Developing Container and Toner Pack]

Figure 5A:
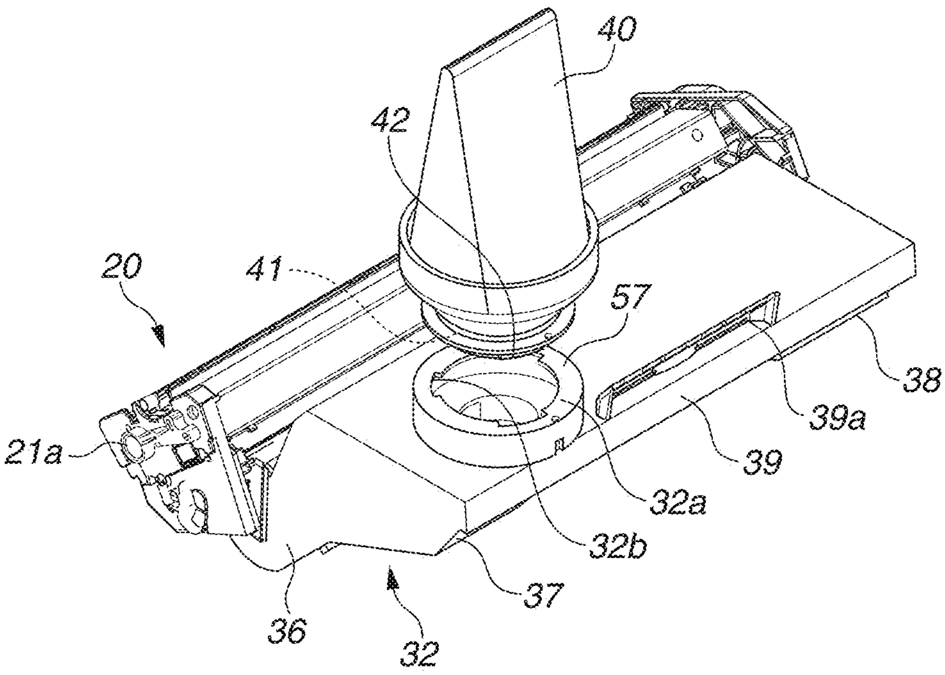
FIG. 5A is a perspective view illustrating a developing container and a toner pack.
Figure 5B:
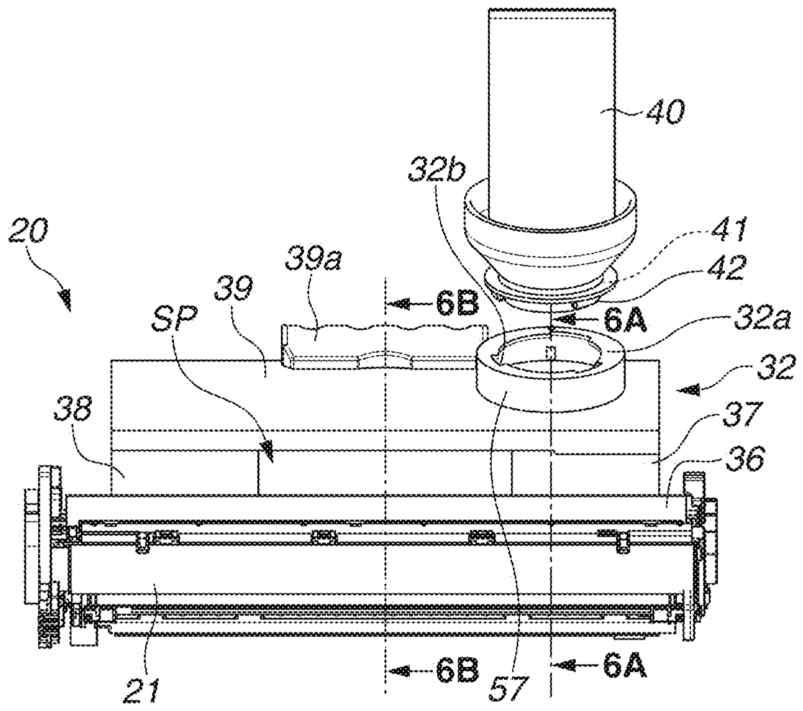
FIG. 5B is a front view illustrating the developing container and the toner pack.

Now, the configurations of the developing container 32 and the toner pack 40 are described. FIG. 5A is a perspective view illustrating the developing container 32 and the toner pack 40. FIG. 5B is a front view illustrating the developing container 32 and the toner pack 40. FIG. 6A is a 6A-6A cross-sectional view in FIG. 5B. FIG. 6B is a 6B-6B cross-sectional view in FIG. 5B.

As illustrated in FIGS. 5A to 6B, the developing container 32 includes a conveying chamber 36 that stores the agitation member 34. The conveying chamber 36 as a storage portion that stores toner extends over the entire length in the longitudinal direction (the left-right direction) of the developing container 32. The conveying chamber 36 rotatably supports the developing roller 31 and the supply roller 33 and stores a developer to be borne on the developing roller 31. The developing container 32 includes a first protruding portion 37 as a protruding portion that protrudes upward from one end portion in the longitudinal direction of the conveying chamber 36 and communicates with the conveying chamber 36, and a second protruding portion 38 that protrudes upward from the other end portion in the longitudinal direction of the conveying chamber 36. In other words, the first protruding portion 37 is provided in one end portion of the developing container 32 in the rotational axis direction of the developing roller 31 and protrudes toward the discharge tray 81 more in an intersection direction intersecting the rotational axis direction than at a central portion of the developing container 32. The second protruding portion 38 is provided in the other end portion of the developing container 32 in the rotational axis direction of the developing roller 31 and protrudes toward the discharge tray 81 more in the intersection direction than at the central portion of the developing container 32. In the present exemplary embodiment, the first protruding portion 37 is formed on the left side of the developing container 32, and the second protruding portion 38 is formed on the right side of the developing container 32. In an upper end portion (a front end portion) of the first protruding portion 37, an attachment portion 57 to which the toner pack 40 can be attached is provided. In the attachment portion 57, the replenishment opening 32*a* for supplying a developer from the toner pack 40 to the conveying chamber 36 is formed. The toner pack 40 can be attached to the attachment portion 57 in a state where the toner pack 40 is exposed to the outside of the apparatus.

The first protruding portion 37 and the second protruding portion 38 obliquely extend from the conveying chamber 36 toward the near side of the apparatus and upward. In other words, the first protruding portion 37 and the second protruding portion 38 protrude upward and toward downstream in the discharge direction of the discharge roller pair 80. Thus, the replenishment opening 32*a* formed in the first protruding portion 37 is placed on the near side of the image forming apparatus 1, and work of replenishing the developing container 32 with toner can be easily performed.

Particularly, in the present exemplary embodiment, the reading device 200 openable and closable about the far side of the apparatus is placed above the opening/closing member 83. Thus, placement of the replenishment opening 32*a* on the near side of the apparatus enables the more effective use of the space between the replenishment opening 32*a* and the reading device 200. Thus, it is possible to improve workability when toner is supplied through the replenishment opening 32*a*.

An upper portion of the first protruding portion 37 and an upper portion of the second protruding portion 38 are connected together by a handle portion 39 as a connection portion. Between the handle portion 39 and the conveying chamber 36, a laser passage space SP is formed as a gap through which laser L (see FIG. 1A) emitted from the scanner unit 11 (see FIG. 1A) to the photosensitive drum 21 can pass.

The handle portion 39 includes a knob portion 39*a* that the user can hold by hooking his or her finger on the knob portion 39*a*. The knob portion 39*a* is formed to protrude upward from a top surface of the handle portion 39. The inside of the first protruding portion 37 is formed into a hollow shape, and the replenishment opening 32*a* is formed in an upper surface of the first protruding portion 37. The replenishment opening 32*a* is configured to be connectable with the toner pack 40.

The first protruding portion 37 in the front end portion of which the replenishment opening 32*a* is formed is provided on one side in the longitudinal direction of the developing container 32, whereby it is possible to secure the laser passage space SP through which the laser L emitted from the scanner unit 11 can pass. Thus, it is possible to miniaturize the image forming apparatus 1. Further, the second protruding portion 38 is provided on the other side in the longitudinal direction of the developing container 32, and the handle portion 39 connecting the first protruding portion 37 and the second protruding portion 38 is also formed. Thus, it is possible to improve usability when the process cartridge 20 is taken out of the printer main body 100. The second protruding portion 38 may be formed into a hollow shape similar to the first protruding portion 37, or may be formed into a solid shape.

The toner pack 40 is configured to be attachable to and detachable from the attachment portion 57 of the first protruding portion 37. The toner pack 40 includes a shutter member 41 that is provided in an open portion and openable and closable, and a plurality of (three in the present exemplary embodiment) protrusions 42 formed corresponding to a plurality of (three in the present exemplary embodiment) groove portions 32*b* formed in the attachment portion 57. The shutter member 41 is configured to be movable between an opened position where the open portion is opened and a closed position where the open portion is closed. To supply toner to the developing container 32, the user positions the toner pack 40 so that the protrusions 42 of the toner pack 40 pass through the groove portions 32*b* of the attachment portion 57, and connects the toner pack 40 to the attachment portion 57. Then, if the toner pack 40 is rotated 180 degrees in this state, the shutter member 41 of the toner pack 40 hits a hitting portion (not illustrated) of the attachment portion 57, whereby the shutter member 41 rotates relative to a main body of the toner pack 40 and is opened. Consequently, toner stored in the toner pack 40 drops from the toner pack 40, and the toner having dropped passes through the replenishment opening 32*a* and enters the first protruding portion 37, which has a hollow shape. The shutter member 41 may be provided on the replenishment opening 32*a* side.

The first protruding portion 37 includes a sloping surface 37*a* at a position opposed to the opening of the replenishment opening 32*a*, and the sloping surface 37*a* slopes down toward the conveying chamber 36. Thus, the toner supplied through the replenishment opening 32*a* is guided to the conveying chamber 36 by the sloping surface 37*a*. The agitation member 34 includes an agitation shaft 34*a* extending in the longitudinal direction of the agitation member 34, and a blade portion 34*b* that extends further outward in the radial direction of the agitation member 34 than the agitation shaft 34*a* does.

The toner supplied through the replenishment opening 32*a* placed upstream in the conveying direction of the agitation member 34 is fed to the developing roller 31 and the supply roller 33 by the rotation of the agitation member 34. The conveying direction of the agitation member 34 is a direction parallel to the longitudinal direction of the developing container 32. Although the replenishment opening 32*a* and the first protruding portion 37 are placed in one end portion in the longitudinal direction of the developing container 32, the agitation member 34 repeats the rotation, thereby spreading the toner over the entire length of the developing container 32. Although the agitation member 34 includes the agitation shaft 34*a* and the blade portion 34*b* in the present exemplary embodiment, an agitation shaft having a spiral shape may be used as a component for spreading the toner over the entire length of the developing container 32.

Figure 7:
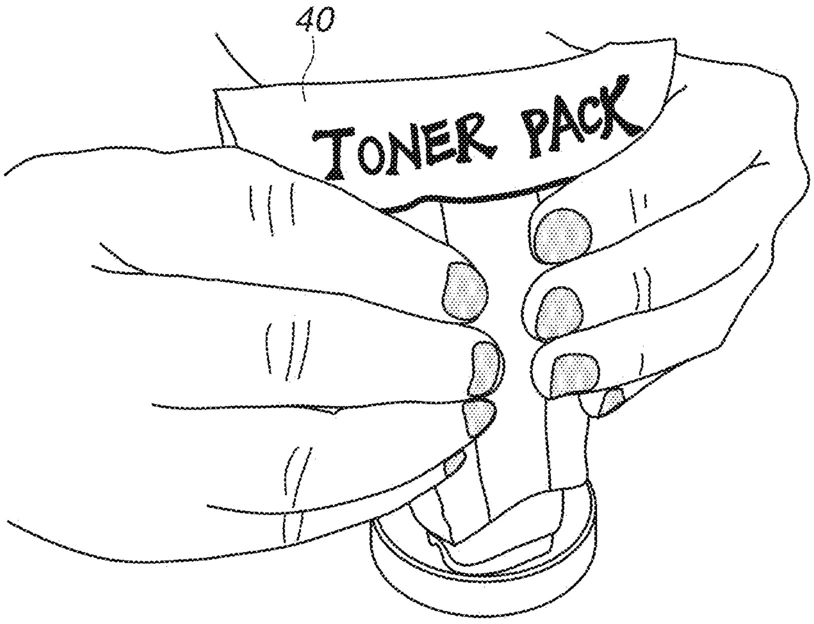
FIG. 7 is a perspective view illustrating the toner pack.
Figure 8A:
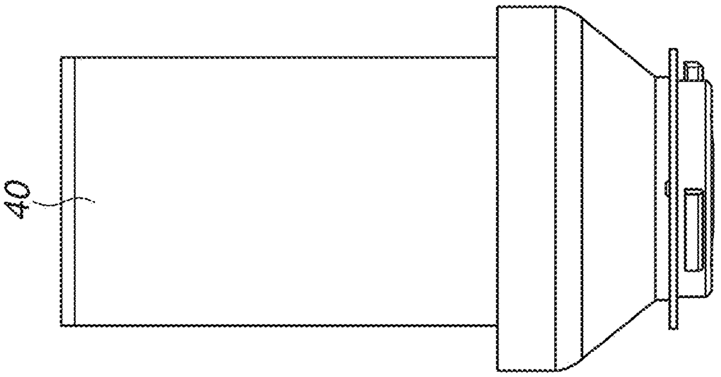
FIG. 8A is a front view illustrating the toner pack.
Figure 8B:
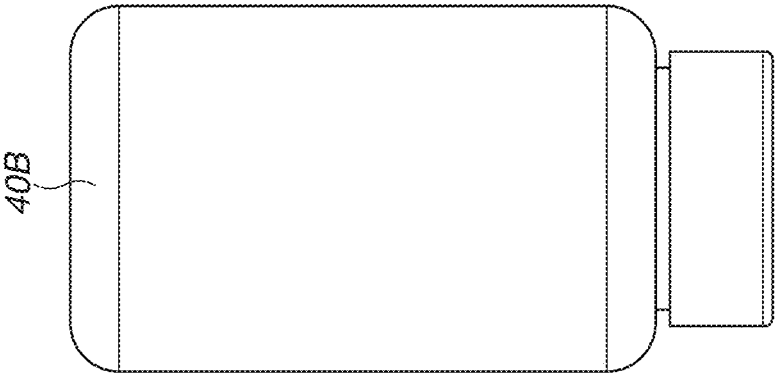
FIG. 8B is a front view illustrating a first modification of the toner pack.
Figure 8C:
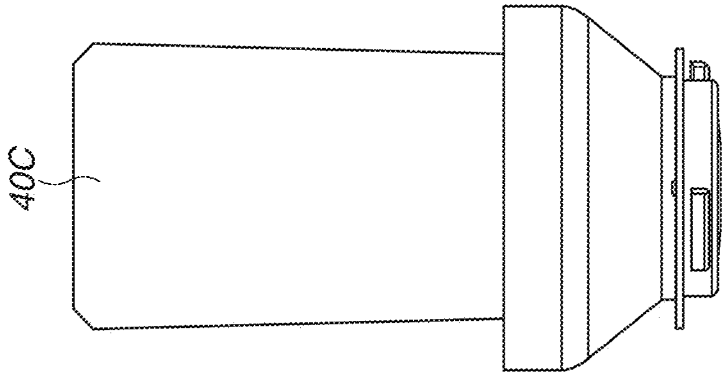
FIG. 8C is a front view illustrating a second modification of the toner pack.

In the present exemplary embodiment, as illustrated in FIGS. 7 and 8A, the toner pack 40 is composed of a bag member made of plastic that is easily deformable. The toner pack 40, however, is not limited thereto. For example, the toner pack may be composed of a bottle container 40B having a substantially circular cone shape as illustrated in FIG. 8B, or may be composed of a paper container 40C made of paper as illustrated in FIG. 8C. In any case, the material and the shape of the toner pack may be any material and shape. As a method for discharging toner from the toner pack, in the case of the toner pack 40 or the paper container 40C, a method in which the user squeezes the toner pack with his or her fingers is suitable, and in the case of the bottle container 40B, a method in which the user drops toner while causing the container to vibrate by tapping the container is suitable. A discharge mechanism may be provided in the bottle container 40B to discharge toner from the bottle container 40B. Further, the discharge mechanism may be configured to be engaged with the printer main body 100 and receive a driving force from the printer main body 100.

In any of the toner packs, the shutter member 41 may be omitted, or a sliding shutter member may be applied instead of the rotary shutter member 41. The shutter member 41 may be configured to be torn by the toner pack being attached to the replenishment opening 32*a* or being rotated in the attached state, or may have a removable cover structure such as a seal.

[Method for Detecting Remaining Amount of Toner]

Figure 9A:
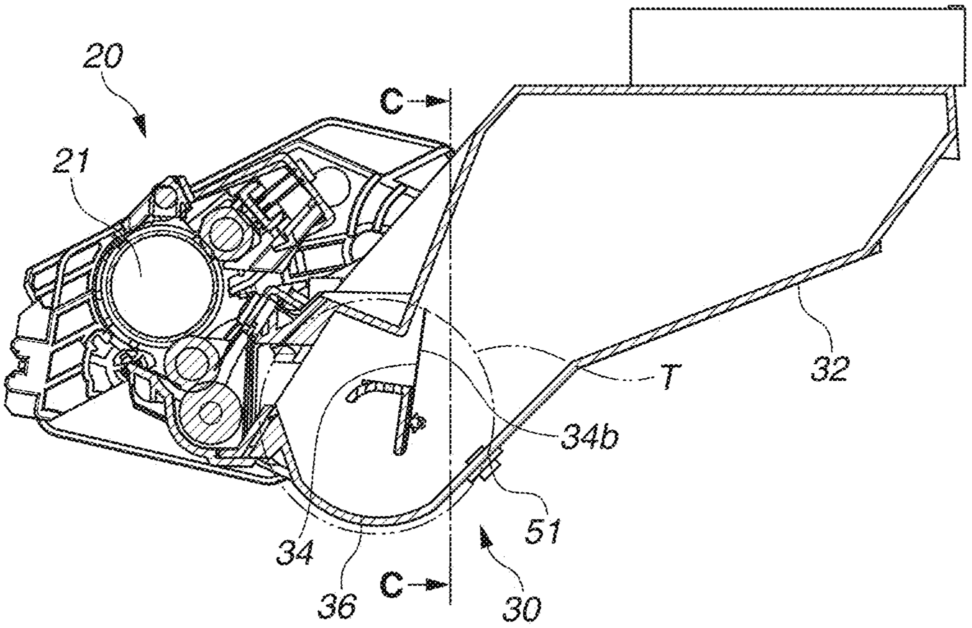
FIG. 9A is a cross-sectional view illustrating a toner remaining amount sensor.
Figure 9B:
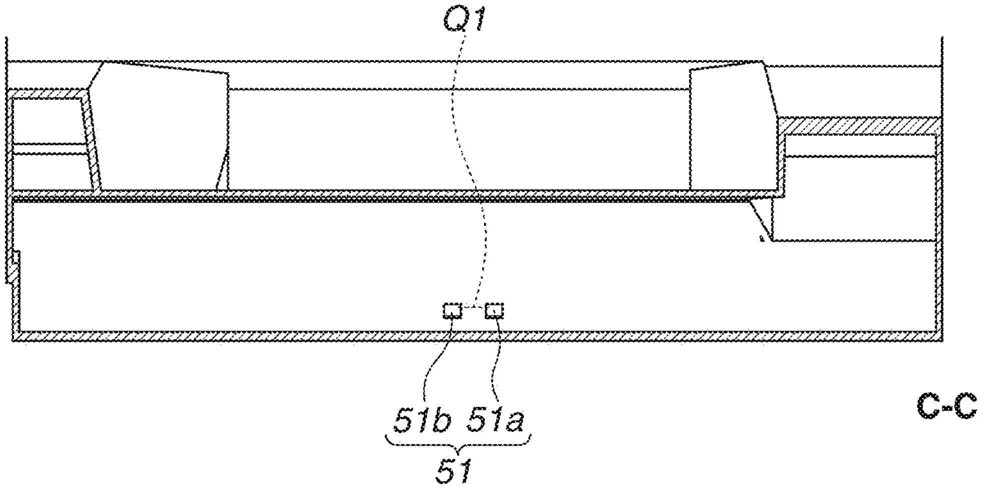
FIG. 9B is a C-C cross-sectional view in FIG. 9A.
Figure 10:
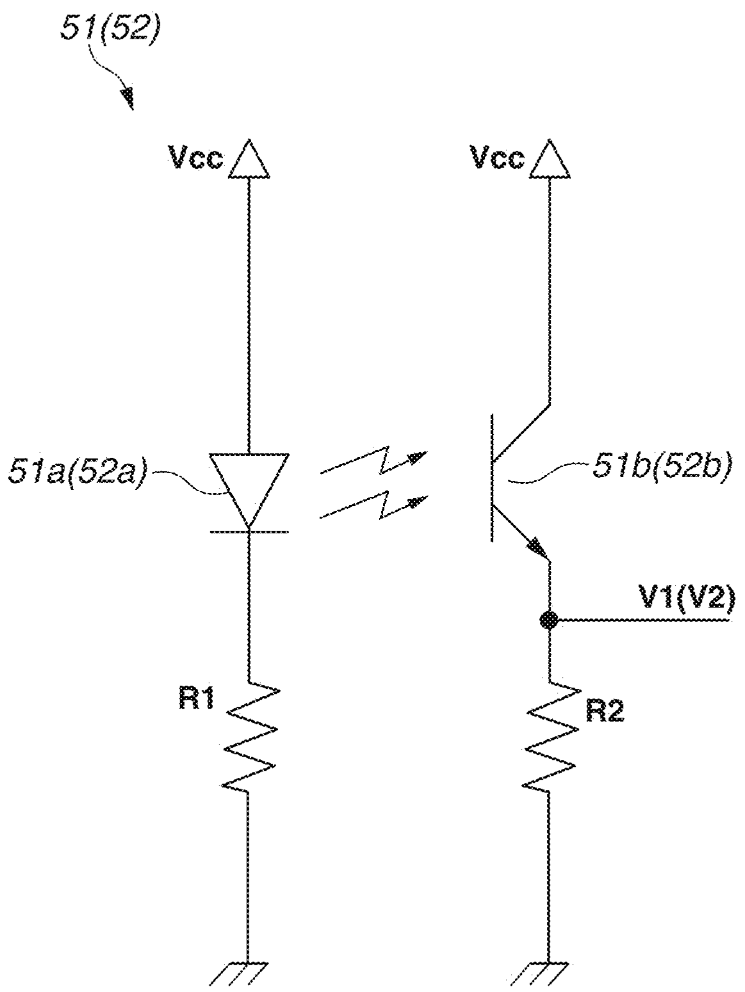
FIG. 10 is a circuit diagram illustrating first and second toner remaining amount sensors.

Now, with reference to FIGS. 9 to 11, a method for detecting the remaining amount of toner in the developing container 32 is described. In the developing device 30 according to the present exemplary embodiment, a toner remaining amount sensor 51 (a detection means) that detects remaining amount information according to the remaining amount of toner in the developing container 32 is installed.

The toner remaining amount sensor 51 includes a light-emitting portion 51*a* and a light-receiving portion 51*b*. FIG. 9A is a cross-sectional view illustrating the toner remaining amount sensor 51. FIG. 9B is a schematic cross-sectional view of a C-C cross section in FIG. 9A viewed in a direction from the process cartridge 20 side toward the developing container 32. FIG. 10 is a circuit diagram illustrating an example of a circuit configuration of the toner remaining amount sensor 51.

In FIG. 10, an LED is used as the light-emitting portion 51*a*, and a phototransistor that is turned on by light from the LED is used as the light-receiving portion 51*b*. The light-emitting portion 51*a* and the light-receiving portion 51*b*, however, are not limited thereto. For example, a halogen lamp or a fluorescent light may be applied to the light-emitting portion 51*a*, and a photodiode or an avalanche photodiode may be applied to the light-receiving portion 51*b*. Between the light-emitting portion 51*a* and a power supply voltage Vcc, a switch (not illustrated) is provided. The switch is turned on, whereby a voltage from the power supply voltage Vcc is applied to the light-emitting portion 51*a*, and the light-emitting portion 51*a* becomes conductive. On the other hand, between the light-receiving portion 51*b* and the power supply voltage Vcc, a switch (not illustrated) is also provided. The switch is turned on, whereby the light-receiving portion 51*b* becomes conductive by a current depending on an amount of detected light.

To the light-emitting portion 51*a*, the power supply voltage Vcc and a current-limiting resistor R1 are connected. The light-emitting portion 51*a* emits light by a current determined by the current-limiting resistor R1. The light emitted from the light-emitting portion 51*a* passes through an optical path Q1 and is received by the light-receiving portion 51*b* as illustrated in FIG. 9B. To a collector terminal of the light-receiving portion 51*b*, the power supply voltage Vcc is connected. To an emitter terminal thereof, a detection resistor R2 is connected. The light-receiving portion 51*b* that is a phototransistor receives the light emitted from the light-emitting portion 51*a* and outputs a signal (a current) depending on an amount of the received light. This signal is converted into a voltage V1 by the detection resistor R2, and the voltage V1 is input to an analog-to-digital (A/D) conversion portion 95 of a control portion 90 (see FIG. 12).

Based on the level of the input voltage, the control portion 90 (a central processing unit (CPU) 91) determines whether the light-receiving portion 51*b* has received light from the light-emitting portion 51*a*. Based on the length of the time and the light intensity of the received light when the light-receiving portion 51*b* detects each beam of light when toner in the developing container 32 is agitated for a certain period of time by the agitation member 34, the control portion 90 (the CPU 91) calculates the amount of toner (the amount of developer) in the developing container 32. More specifically, a read-only memory (ROM) 93 stores in advance a table that enables output of the remaining amount of toner based on the light reception time and the light intensity when toner is conveyed by the agitation member 34. Based on the input to the A/D conversion portion 95 and the table, the control portion 90 estimates and calculates the remaining amount of toner.

More specifically, the optical path Q1 of the toner remaining amount sensor 51 is set to intersect a trajectory T of the rotation of the agitation member 34 when viewed from the rotational axis direction of the agitation member 34 illustrated in FIG. 9A. Then, the time the optical path Q1 is shielded from light by toner conveyed by the agitation member 34, i.e., the time the light-receiving portion 51*b* does not detect light from the light-emitting portion 51*a*, in one revolution of the agitation member 34 changes depending on the remaining amount of toner. The light intensity of the light received by the light-receiving portion 51*b* also changes depending on the remaining amount of toner.

In other words, when the remaining amount of toner is great, the optical path Q1 is likely to be blocked by toner, and therefore, the time the light-receiving portion 51*b* receives light is short, and the light intensity of the light received by the light-receiving portion 51*b* is small. On the other hand, when the remaining amount of toner is small, conversely, the time the light-receiving portion 51*b* receives light is long, and the light intensity of the light received by the light-receiving portion 51*b* is great. Thus, based on the light reception time and the light intensity of the light-receiving portion 51*b* in this manner, the control portion 90 can determine the level of the remaining amount of toner as described below.

Figure 11A:
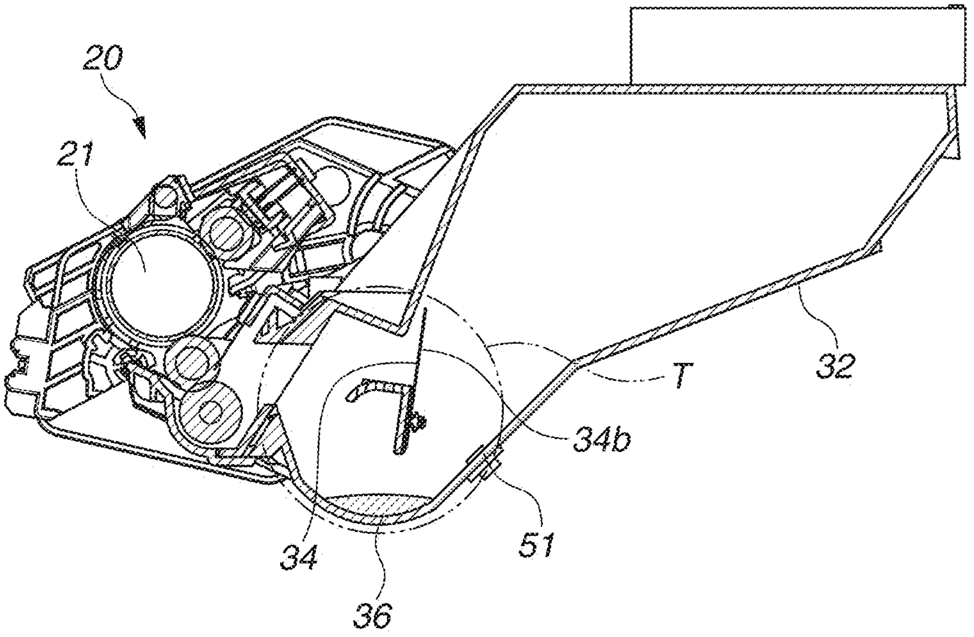
FIG. 11A is a cross-sectional view illustrating the developing container in a state where a remaining amount of toner is small.
Figure 11B:
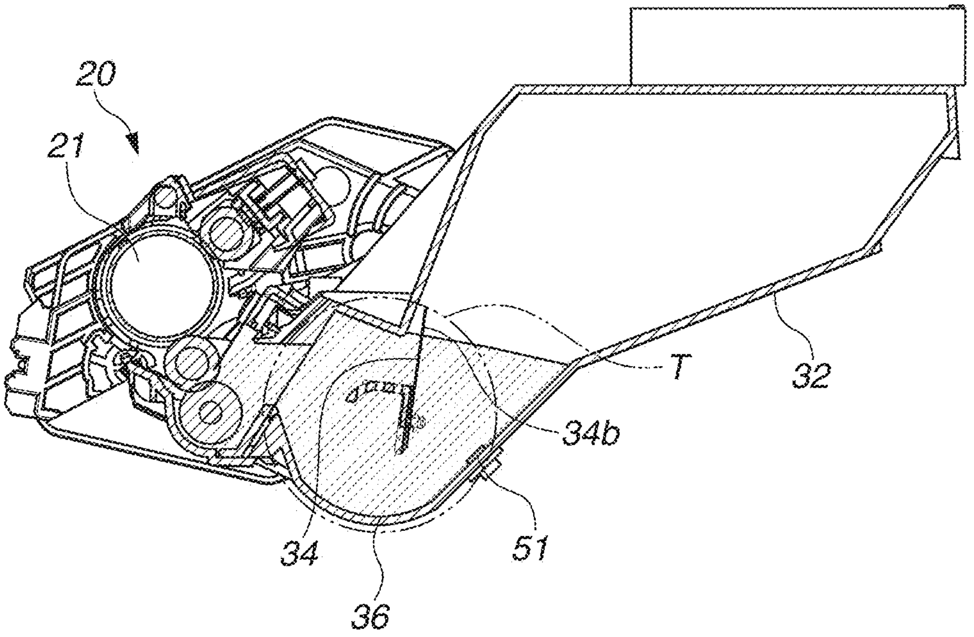
FIG. 11B is a cross-sectional view illustrating the developing container in a state where the remaining amount of toner is great.

For example, as illustrated in FIG. 11A, if the amount of toner in the conveying chamber 36 of the developing container 32 is a minute amount, the time the light-receiving portion 51*b* receives light is long, and the light intensity of the light received by the light-receiving portion 51*b* is great. Thus, it is determined that the remaining amount of toner is small. On the other hand, as illustrated in FIG. 11B, if the amount of toner in the conveying chamber 36 of the developing container 32 is great, the time the light-receiving portion 51*b* receives light is short, and the light intensity of the light received by the light-receiving portion 51*b* is small. Thus, it is determined that the remaining amount of toner is great.

The method for detecting or estimating the remaining amount of toner is not limited to the optical toner remaining amount detection system described with reference to FIG. 9, and methods for detecting or estimating the remaining amount of toner using various known systems can be employed. For example, two or more metal plates or conductive resin sheets extending in the longitudinal direction of the developing roller may be placed on an inner wall of the developing container 32 that is the frame member, the capacitance between the two metal plates or conductive resin sheets may be measured, and the remaining amount of toner may be detected or estimated. Alternatively, a load cell may be provided to support the developing device 30 from below, and the CPU 91 may subtract the weight of the developing device 30 when there is no toner therein from the weight measured by the load cell, thereby calculating the remaining amount of toner.

[Control System of Image Forming Apparatus]

Figure 12:
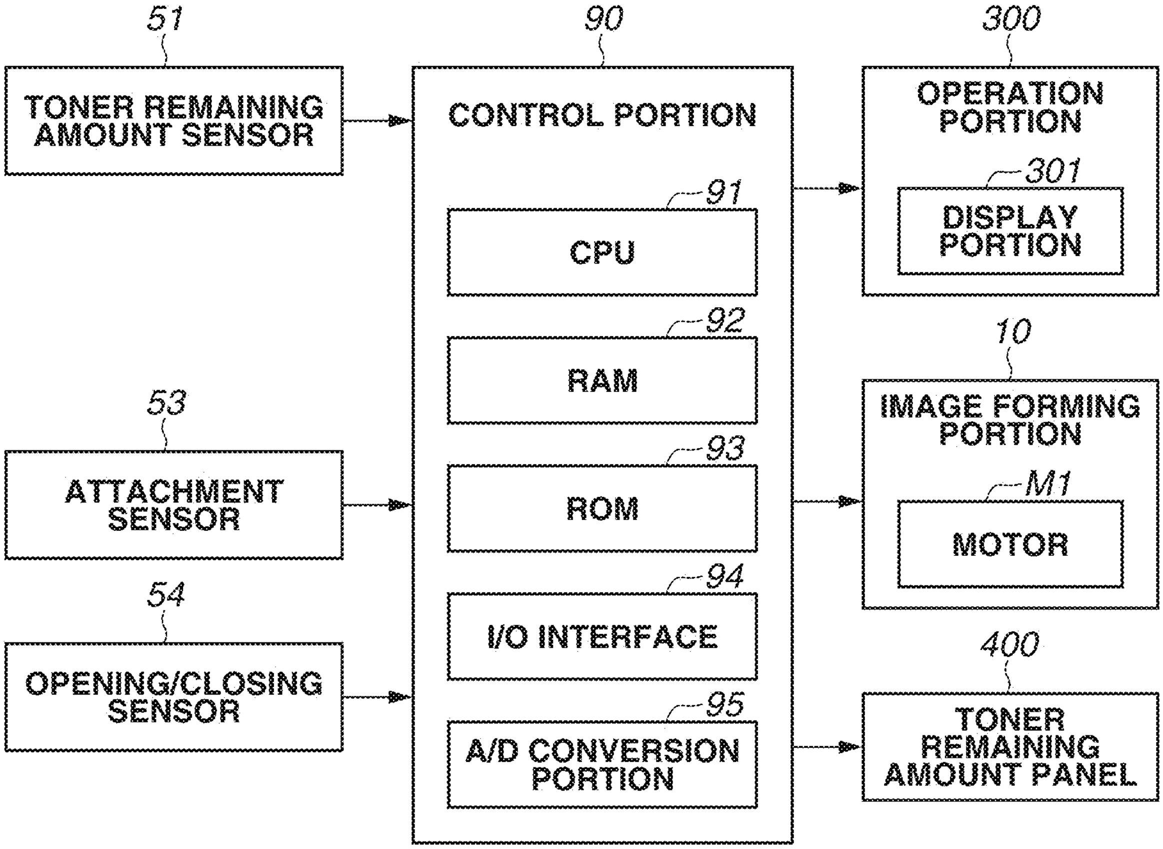
FIG. 12 is a block diagram illustrating a control system of the image forming apparatus.

FIG. 12 is a block diagram illustrating a control system of the image forming apparatus 1. The control portion 90 as a control means of the image forming apparatus 1 includes the CPU 91 as a calculation device, a random-access memory (RAM) 92 used as a work area for the CPU 91, and the ROM 93 that stores various programs. The control portion 90 also includes an input/output (I/O) interface 94 as an input/output port connected to an external device, and the A/D conversion portion 95 that converts an analog signal into a digital signal.

To the input side of the control portion 90, the toner remaining amount sensor 51, an attachment sensor 53, and an opening/closing sensor 54 are connected. The attachment sensor 53 detects that the toner pack 40 is attached to the replenishment opening 32*a* of the developing container 32. For example, the attachment sensor 53 is provided in the replenishment opening 32*a* and includes a pressure-sensitive switch that outputs a detection signal when pressed by the protrusions 42 of the toner pack 40. The opening/closing sensor 54 detects whether the opening/closing member 83 is opened relative to the top cover 82. The opening/closing sensor 54 includes, for example, a pressure-sensitive switch or a magnetic sensor.

To the control portion 90, the operation portion 300, the image forming portion 10, and a toner remaining amount panel 400 as an informing means capable of providing information regarding the remaining amount of toner are connected. The operation portion 300 includes a display portion 301 capable of displaying various setting screens, a physical key or the like. The display portion 301 includes, for example, a liquid crystal panel. The image forming portion 10 includes the motor M1 as a driving source that drives the photosensitive drum 21, the developing roller 31, the supply roller 33, the agitation member 34, and the like. The photosensitive drum 21, the developing roller 31, the supply roller 33, and the agitation member 34 may be configured to be driven by separate motors.

As illustrated in FIGS. 1B and 13, the toner remaining amount panel 400 is provided on the right side on a front surface of a housing of the printer main body 100, i.e., on the opposite side of the operation portion 300 placed on the left side, and displays information regarding the remaining amount of toner in the developing container 32. In the present exemplary embodiment, the toner remaining amount panel 400 is a panel member including a plurality of (three in the present exemplary embodiment) graduations arranged vertically, and the graduations correspond to a low level, a mid level, and a full level described below.

Figure 13A:
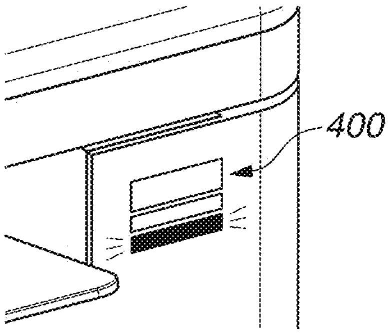
FIG. 13A is a perspective view illustrating a toner remaining amount panel when the remaining amount of toner is at a near out level.
Figure 13B:
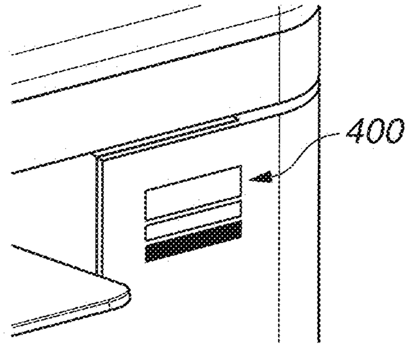
FIG. 13B is a perspective view illustrating the toner remaining amount panel when the remaining amount of toner is at a low level.
Figure 13C:
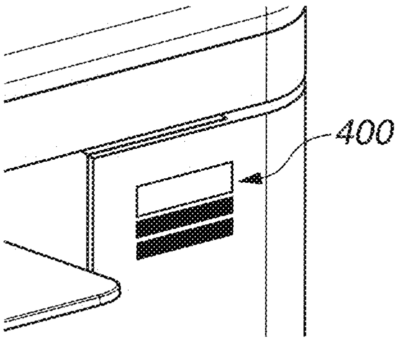
FIG. 13C is a perspective view illustrating the toner remaining amount panel when the remaining amount of toner is at a mid level.
Figure 13D:
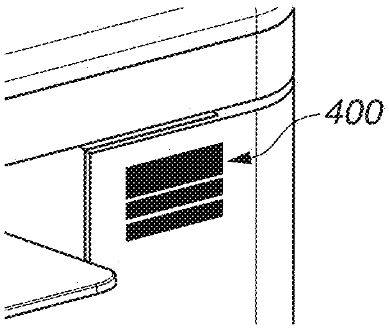
FIG. 13D is a perspective view illustrating the toner remaining amount panel when the remaining amount of toner is at a full level.

More specifically, as illustrated in FIG. 13A, if only the lowest graduation is turned on and blinks, it indicates that the remaining amount of toner in the developing container 32 is at a near out level, which is a fourth state. As illustrated in FIG. 13B, if only the lowest graduation is turned on, it indicates that the remaining amount of toner in the developing container 32 is at the low level, which is a third state (third display). As illustrated in FIG. 13C, if the lowest gradation and a middle graduation are turned on, and the highest graduation is turned off, it indicates that the remaining amount of toner in the developing container 32 is at the mid level, which is a second state. As illustrated in FIG. 13D, if all of the three graduations are turned on, it indicates that the remaining amount of toner in the developing container 32 is at the full level, which is a first state.

The toner remaining amount panel 400 is not limited to a liquid crystal panel, and may be composed of a light source such as an LED or an incandescent light and a diffusing lens. Alternatively, a configuration may be employed in which the toner remaining amount panel 400 is not separately provided, and the remaining amount of toner may be displayed using graduations as described in the present exemplary embodiment on a display of the operation portion 300. While the configuration has been described in which four states are displayed using three graduations in the present exemplary embodiment, the number of graduations is not limited to this, and may be appropriately set according to the configuration of the image forming apparatus. While the informing means indicating the remaining amount of toner has been described in the example illustrated in FIG. 13, the toner remaining amount panel 400 is not limited to this. For example, the display in FIG. 13B may be display indicating that toner supply is necessary, the display in FIG. 13C may be display indicating that the toner supply is unnecessary, and the display in FIG. 13D may be display indicating that the toner supply is sufficiently performed.

[Toner Supply Process]

<Display of Toner Remaining Amount Panel when Toner is Consumed>

Figure 14:
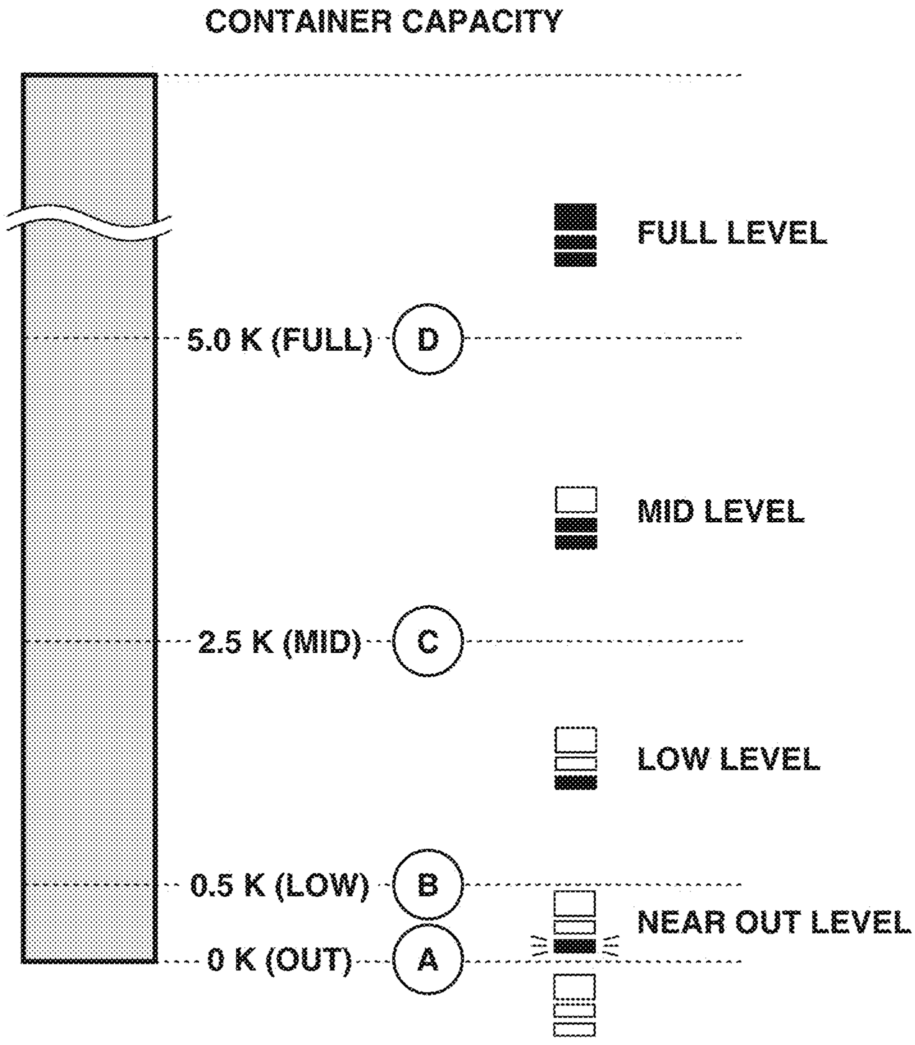
FIG. 14 is a graph illustrating a relationship between a capacity of the developing container and a level of the remaining amount of toner.

Now, a description is given of the switching of the display of the toner remaining amount panel 400 when toner is consumed according to the present exemplary embodiment. FIG. 14 is a schematic diagram illustrating thresholds for switching the display of the toner remaining amount panel 400 depending on the remaining amount of toner in the developing container 32 and the display patterns of the toner remaining amount panel 400 when toner is consumed.

As illustrated in FIG. 14, if toner in the developing container 32 is consumed by the image forming operation, the display of the toner remaining amount panel 400 is switched based on a detection result of the toner remaining amount sensor 51 described above. In other words, detection (first detection) is made by the toner remaining amount sensor 51 to reflect a decrease in the amount of toner in the developing container 32 by the image forming operation on the display of the toner remaining amount panel 400. Specifically, if the detection result of the remaining amount of toner in the developing container 32 by the toner remaining amount sensor 51 is greater than or equal to a threshold D (a first threshold), the control portion 90 sets the display of the toner remaining amount panel 400 to the first state (first display) which indicates the full level and where all the three graduations are turned on. If the detection result of the remaining amount of toner in the developing container 32 by the toner remaining amount sensor 51 is less than the threshold D as toner is consumed, the control portion 90 sets the display of the toner remaining amount panel 400 to the second state (second display) which indicates the mid level and where the two graduations are turned on. In the present exemplary embodiment, the value of the threshold D is set to 5.0 K. Various thresholds described below including the threshold D may be appropriately set depending on the volume of toner to be supplied or various configurations of the image forming apparatus.

If the detection result of the remaining amount of toner in the developing container 32 by the toner remaining amount sensor 51 is less than a threshold C (2.5 K in the present exemplary embodiment) as toner is consumed, the control portion 90 sets the display of the toner remaining amount panel 400 to the third state (third display) which indicates the low level and where one graduation is turned on. If the detection result of the remaining amount of toner in the developing container 32 by the toner remaining amount sensor 51 is less than a threshold B (0.5 K in the present exemplary embodiment), the control portion 90 sets the display of the toner remaining amount panel 400 to the fourth state (fourth display) which indicates the near out level and where one lowest graduation blinks. Then, if the detection result of the remaining amount of toner in the developing container 32 by the toner remaining amount sensor 51 is less than a threshold A (0 K in the present exemplary embodiment), the control portion 90 determines that toner in the developing container 32 has run out, and then sets the display to the state where all the three graduations are turned off.

More specifically, if the detection result of the toner remaining amount sensor 51 is between 2.5 K and 5.0 K, the control portion 90 sets the display of the toner remaining amount panel 400 to the second state. If the detection result of the toner remaining amount sensor 51 is between 0.5 K and 2.5 K, the control portion 90 sets the display of the toner remaining amount panel 400 to the third state. If the detection result of the toner remaining amount sensor 51 is between 0 K and 0.5 K, the control portion 90 sets the display of the toner remaining amount panel 400 to the fourth state. If it is determined that there is no remaining amount of toner, the control portion 90 sets the display to the state where all the graduations are turned off.

The interval between the threshold D and the threshold C, i.e., the interval between thresholds related to the switching of the display of the top graduation, according to the present exemplary embodiment is set to an amount of supply corresponding to one toner pack 40. Similarly, the interval between the threshold C and the threshold A, i.e., the interval between thresholds related to the switching of the display of the middle graduation, according to the present exemplary embodiment is also set to the amount of supply corresponding to one toner pack 40. The interval between the thresholds related to the switching of the display of the graduation is thus set, whereby the user can easily identify the number of toner packs 40 that can be supplied. Thus, it is possible to improve visibility of the status where toner can be supplied for the user.

On the other hand, in a case where the interval between the thresholds related to the switching of the display of a single graduation is set to be smaller than the amount of supply corresponding to one toner pack 40, the following concern arises depending on a setting range of the interval between the thresholds. For example, if the interval between the thresholds related to the switching of the display of one graduation is set to 1 K on the premise of the capacity of the toner pack 40 and the capacity of the developing container 32 according to the present exemplary embodiment, it is necessary to increase the number of graduations to enable the display of the entire capacity of the developing container 32. This leads to an increase in cost. If the interval between the thresholds related to the switching of the display of one graduation is set to 1 K without increasing the number of graduations to avoid an increase in cost, a setting range of the volume of toner in the developing container 32 is narrowed. From these viewpoints, in the present exemplary embodiment, the interval between the thresholds related to the switching of the display of one graduation is set corresponding to the amount of supply corresponding to one toner pack 40.

<Display of Toner Remaining Amount Panel when Toner is Supplied>

Figure 15:
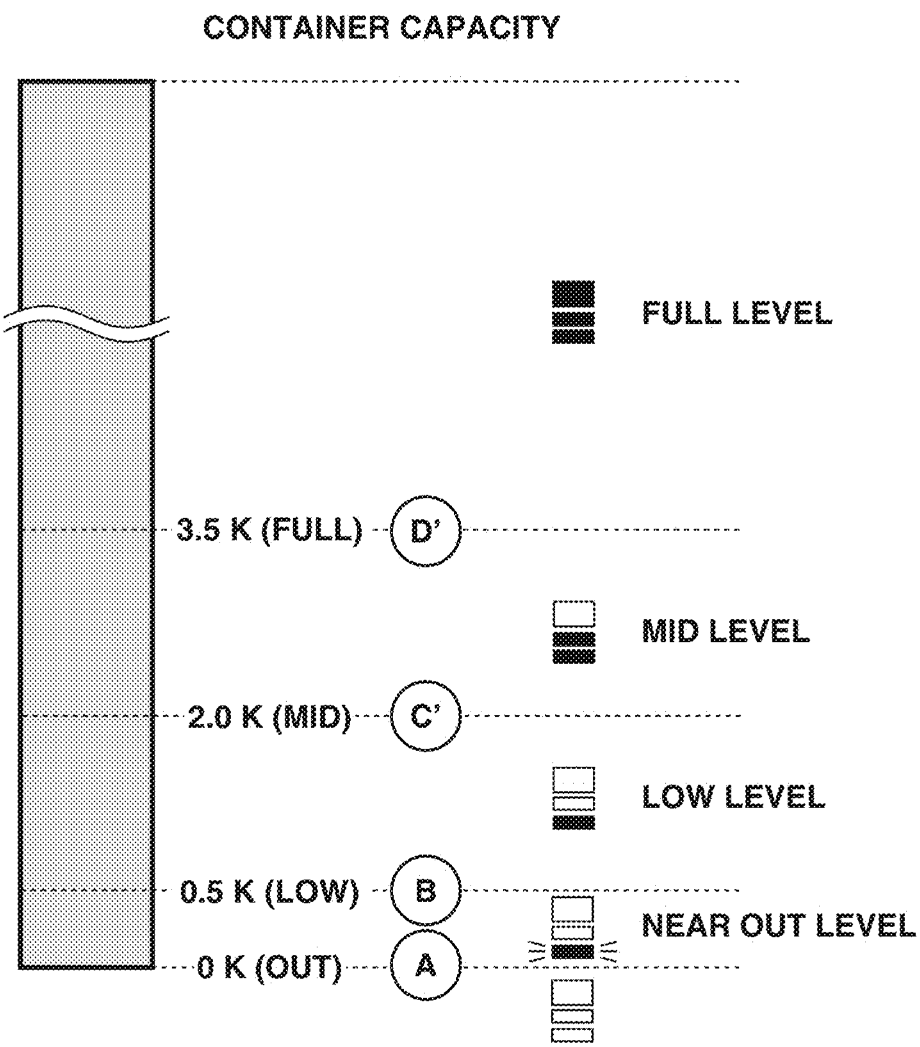
FIG. 15 is a graph illustrating the relationship between the capacity of the developing container and the level of the remaining amount of toner when toner is supplied.

Now, a description is given of the switching of the display of the toner remaining amount panel 400 when toner is supplied according to the present exemplary embodiment. FIG. 15 is a schematic diagram illustrating the thresholds for switching the display of the toner remaining amount panel 400 depending on the remaining amount of toner in the developing container 32 and the display patterns of the toner remaining amount panel 400 when toner is supplied.

As illustrated in FIG. 15, if toner is supplied to the developing container 32 by the user supplying toner using the toner pack 40, the display of the toner remaining amount panel 400 is switched based on the detection result of the toner remaining amount sensor 51 as described above. Detection (second detection) is made by the toner remaining amount sensor 51 to reflect an increase in the amount of toner in the developing container 32 by the supply of toner on the display of the toner remaining amount panel 400. Specifically, if the detection result of the remaining amount of toner in the developing container 32 by the toner remaining amount sensor 51 is greater than or equal to a threshold D' (a second threshold), the control portion 90 sets the display of the toner remaining amount panel 400 to the first state which indicates the full level and where all the three graduations are turned on. If the detection result of the remaining amount of toner in the developing container 32 by the toner remaining amount sensor 51 is greater than or equal to a threshold C' as toner is supplied, the control portion 90 sets the display of the toner remaining amount panel 400 to the second state which indicates the mid level and where the two graduations are turned on.

In the present exemplary embodiment, the values of the thresholds for switching the display between the full level and the mid level are set to different values between when toner is supplied and when toner is consumed. More specifically, as illustrated in FIG. 15, the threshold D' (3.5 K in the present exemplary embodiment) for turning on the top graduation by supplying toner from the second state is set to a value smaller than the threshold D (5.0 K) when toner is consumed. Similarly, the threshold C' (2.0 K in the present exemplary embodiment) for turning on the middle graduation by supplying toner from the third state is set to a value smaller than the threshold C (2.5 K) when toner is consumed. The display of the low level as the third state and the near out level as the fourth state and the thresholds B and A are similar to those when toner is consumed, and therefore are not described.

More specifically, in the configuration of the present exemplary embodiment, if the detection result of the toner remaining amount sensor 51 after toner is supplied using the toner pack 40 is greater than or equal to 2.0 K, the control portion 90 sets the display of the toner remaining amount panel 400 to the second state. If the detection result of the toner remaining amount sensor 51 after toner is supplied using the toner pack 40 is greater than or equal to 3.5 K, the control portion 90 sets the display of the toner remaining amount panel 400 to the first state. In other words, on the toner remaining amount panel 400, the amount of toner in the developing container 32 when the second state switches to the first state when toner is supplied (when the second detection is made) is smaller than the amount of toner in the developing container 32 when the first state switches to the second state when toner is consumed (when the first detection is made). While the value of the threshold D' is set to 3.5 K and the value of the threshold C' is set to 2.0 K in the present exemplary embodiment, the thresholds are not limited thereto. The above thresholds may be appropriately set depending on the volume of toner to be supplied or various configurations of the image forming apparatus as long as each threshold is at least set to a value smaller than a threshold when toner is consumed.

The reason for varying the thresholds D' and C' when toner is supplied from the thresholds D and C when toner is consumed is described in detail below.

As described above, the interval between the thresholds corresponding to the switching of the display of one graduation, i.e., each of the interval between the thresholds D and C and the interval between the thresholds C and A, according to the present exemplary embodiment is set to the amount of supply corresponding to one toner pack 40. This enables the user to easily identify the number of toner packs 40 that can be supplied. Thus, it is possible to improve the visibility of the status where toner can be supplied for the user.

In a case where the interval between the thresholds corresponding to the switching of the display of one graduation is set to a value greater than the amount of supply corresponding to one toner pack 40, and when the user supplies toner using the toner pack 40, the display of the toner remaining amount panel 400 may not change. In this case, the display of the toner remaining amount panel 400 does not change even though the user supplies an amount corresponding to one toner pack 40. Thus, it is difficult to identify whether the replenishment is successful. Thus, as in the configuration of the present exemplary embodiment, it is desirable that the interval between the thresholds corresponding to the switching of the display of one graduation be set corresponding to the amount of supply corresponding to one toner pack 40.

If the method for detecting the remaining amount of toner by the toner remaining amount sensor 51 is used, a slight error in detection may occur between the remaining amount of toner in the developing container 32 and the detection result although the error is set within an acceptable range of each apparatus. Further, in the toner supply configuration according to the present exemplary embodiment, since the user supplies toner using the toner pack 40, an error in replenishment, e.g., an actual amount of supply is smaller than an assumed amount of supply, may occur depending on handling thereof by the user. If the detection is influenced by these errors, the display of the toner remaining amount panel 400 may not switch even though the user has supplied toner, whereby it may be difficult for the user to identify whether the supply of toner is successful.

Accordingly, in the present exemplary embodiment, the thresholds D' and C' when toner is supplied are set to be smaller than the thresholds D and C when toner is consumed. Consequently, even if the detection is influenced by the error in detection by the toner remaining amount sensor 51 or the error in handling when toner is supplied by the user, it is possible to appropriately switch the display of the toner remaining amount panel 400 when toner is supplied by the user. As a result, it is possible to notify the user that the toner is appropriately supplied. Thus, it is possible to improve the visibility of the toner supply status.

Second Exemplary Embodiment

Figure 16:
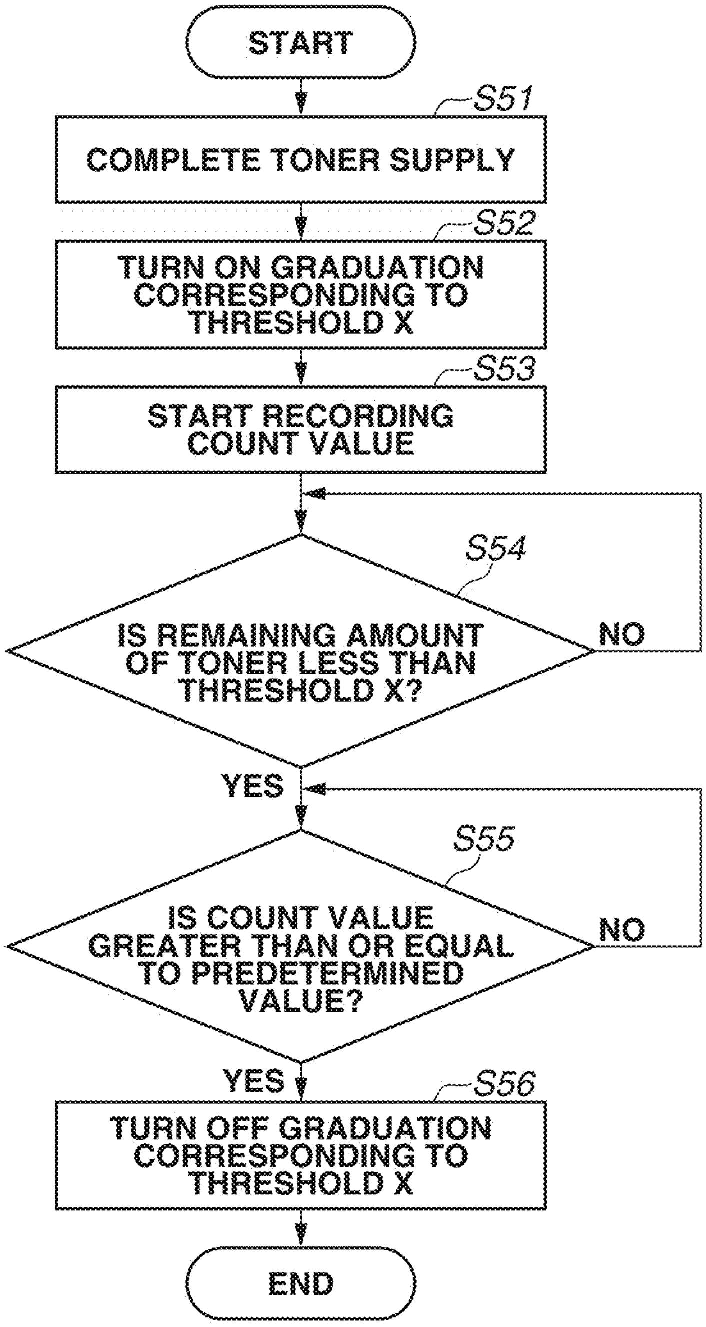
FIG. 16 is a flowchart illustrating a flow of control according to a second exemplary embodiment.

Now, with reference to FIG. 16, a second exemplary embodiment of the present invention is described. The second exemplary embodiment is different from the first exemplary embodiment in that the timing of the switching of the display of the toner remaining amount panel 400 after the supply of toner is adjusted. Other operations and configurations of the image forming apparatus are substantially the same as those in the first exemplary embodiment. Thus, in the following description, the configurations and operations in common with those in the first exemplary embodiment are designated by the same signs, and are not described.

As described in the first exemplary embodiment, if the supply of toner by the user is completed, the display of the toner remaining amount panel 400 switches after the detection by the toner remaining amount sensor 51 is made. At this time, if the toner is supplied to be in a range where the detection result comes out to be close to a threshold for switching the display, a graduation of the toner remaining amount panel 400 may switch immediately after the replenishment under the influence of the error in detection by the toner remaining amount sensor 51. For example, a description is given of a possible concern after the detection result of the toner remaining amount sensor 51 exceeds the threshold D' by supply of toner from the second state, and the display of the toner remaining amount panel 400 switches to the first state. In this case, depending on the error in detection by the toner remaining amount sensor 51, the detection result of the toner remaining amount sensor 51 becomes less than the threshold D shortly after the image forming operation is started, whereby the display of the toner remaining amount panel 400 switches to the second state.

Accordingly, in the present exemplary embodiment, based on image forming information in the image forming operation after toner is supplied, the timing of the switching of the display of the toner remaining amount panel 400 is controlled. FIG. 16 is a flowchart illustrating a flow of control according to the present exemplary embodiment.

As illustrated in FIG. 16, in S51, if the supply of toner by the user is completed, the display of the toner remaining amount panel 400 switches based on the detection result of the toner remaining amount sensor 51. A case is described where toner is supplied from the mid level, which is the second state. Thus, a threshold X illustrated in S52 refers to the threshold D'. By a sequence in S52, the top graduation is turned on, and the display of the toner remaining amount panel 400 switches from the second state to the first state. Then, when the supply of toner by the user is completed, as illustrated in S53, recording of a count value in a storage medium (not illustrated) built into the control portion 90 is started. In the present exemplary embodiment, the presence or absence of an image signal with respect to each pixel at a predetermined frequency that is obtained from an image signal regarding a formed image when image formation is performed is counted and recorded. Then, the count is accumulated every time image formation is performed.

Then, if toner in the developing container 32 is consumed in the image forming operation, then as illustrated in S54, the control portion 90 determines whether the detection result of the toner remaining amount sensor 51 is less than the threshold D. If the remaining amount of toner is below the threshold D in S54 (YES), then in S55, the control portion 90 determines whether the previously recorded count value is greater than or equal to a predetermined value. If the remaining amount of toner is not below the threshold D in S54 (NO), the detection of the remaining amount of toner is repeated at a predetermined timing until the remaining amount of toner is below the threshold D in S54.

If the count value is greater than or equal to the predetermined value in S55 (YES), then in S56, the control portion 90 turns off the graduation corresponding to the threshold D, i.e., switches the display of the toner remaining amount panel 400 from the first state to the second state. On the other hand, if the count value is less than the predetermined value in S55 (NO), the determination of the count value is repeated until the count value is greater than or equal to the predetermined value in S55. In the present exemplary embodiment, the predetermined value used in the determination in S55 is set to a value corresponding to the number of pixels in a case where a predetermined image is formed on 100 recording materials. However, the predetermined value is not limited thereto. The predetermined value used in the determination of the count value may be appropriately set depending on various configurations or control of the image forming apparatus.

Although the control is performed based on the count value of the result of counting the presence or absence of an image signal with respect to each pixel at the predetermined frequency in the present exemplary embodiment, the control is not limited thereto. For example, a configuration may be employed in which the counting of the accumulated number of recording materials on which image formation is performed is started in S53, and if the accumulated count value of recording materials is greater than or equal to a predetermined number in S55, the graduation corresponding to the threshold X is turned off, thereby the display of the toner remaining amount panel 400 is switched. As the counting of the presence or absence of an image signal with respect to each pixel, a method for counting based on an image signal emitted from an exposure device to the photosensitive drum 21 may be used, or a method for counting based on image information loaded into the control portion 90 in advance may be used.

Third Exemplary Embodiment

Figure 17A:
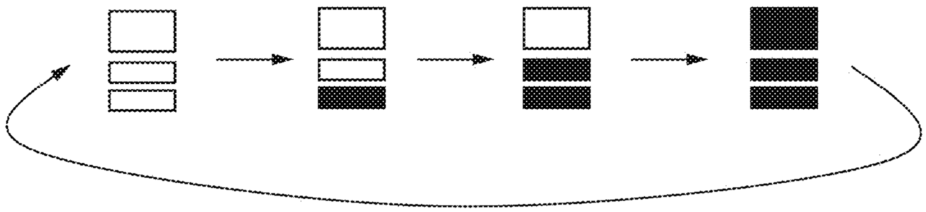
FIG. 17A is a schematic diagram illustrating display during replenishment according to a third exemplary embodiment.
Figure 17B:
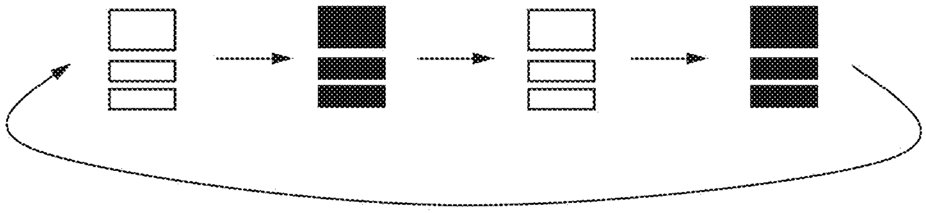
FIG. 17B is a schematic diagram illustrating another pattern of the display during replenishment according to the third exemplary embodiment.
Figure 18:
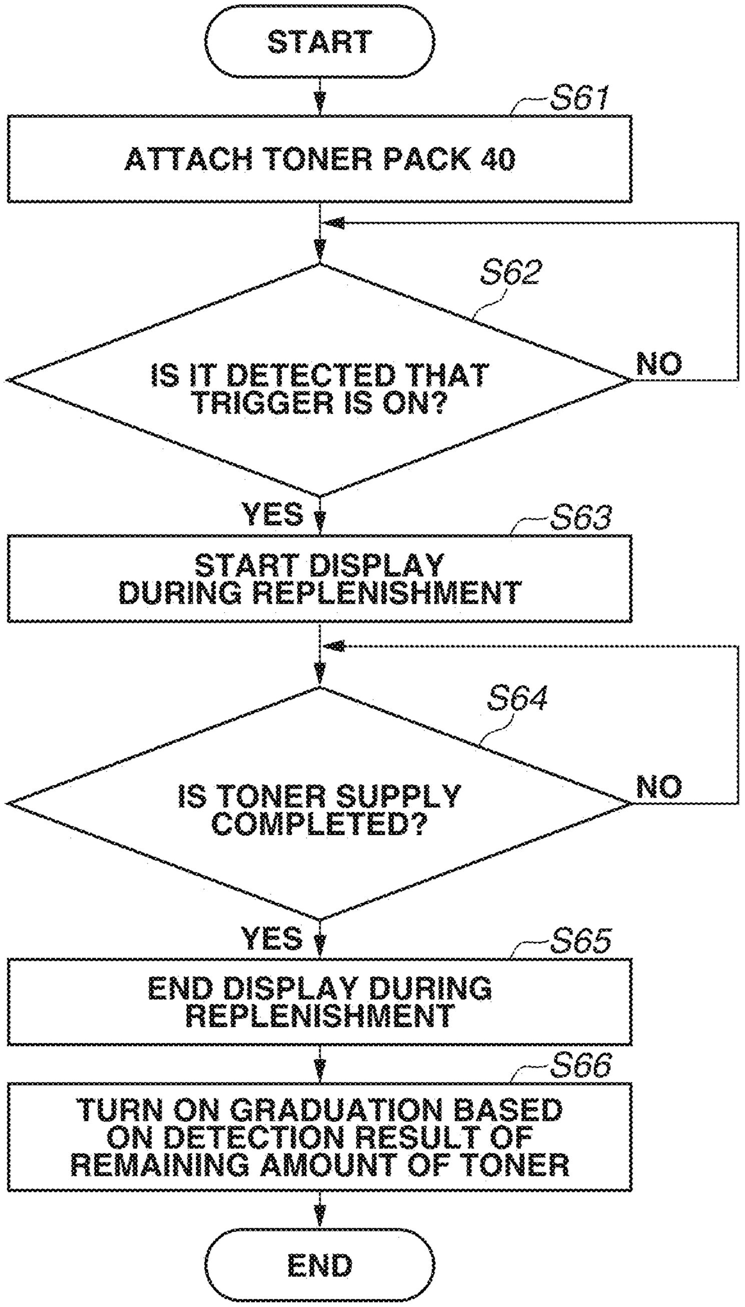
FIG. 18 is a flowchart illustrating a flow of control according to the third exemplary embodiment.

Now, with reference to FIGS. 17 and 18, a third exemplary embodiment of the present invention is described. The third exemplary embodiment is different from the first exemplary embodiment in that the display of the toner remaining amount panel 400 when toner is supplied is controlled. Other operations and configurations of the image forming apparatus, however, are substantially the same as those in the first exemplary embodiment. Thus, in the following description, the configurations and operations in common with those in the first exemplary embodiment are designated by the same signs, and are not described.

FIGS. 17A and 17B are schematic diagrams illustrating the patterns of the display of the toner remaining amount panel 400 when toner is supplied from the toner pack 40 to the developing container 32 by the user according to the present exemplary embodiment. FIG. 18 is a flowchart illustrating a flow of control according to the present exemplary embodiment.

As described above, in the first exemplary embodiment, after the toner supply by the user, the display of the toner remaining amount panel 400 is switched based on the detection result of the toner remaining amount sensor 51. In contrast, in the present exemplary embodiment, display during replenishment is performed in which, while the user supplies toner by attaching the toner pack 40 to the attachment portion 57 (the replenishment opening 32*a*), the display of the toner remaining amount panel 400 is switched as illustrated in FIG. 17A or 17B. Then, after the toner supply is completed, the display of the toner remaining amount panel 400 is switched based on the detection result of the toner remaining amount sensor 51. The display during replenishment is thus performed, whereby, when the user performs a replenishment operation, it is possible to notify the user of the status where toner is currently being supplied. Thus, it is possible to improve visibility of the replenishment status for the user.

As the display during replenishment, a pattern where a state where the three graduations are turned on one by one is repeated as illustrated in FIG. 17A, and a pattern where a state where all the three graduations are turned off and a state where all the three graduations are turned on are repeated as illustrated in FIG. 17B are possible. However, the display during replenishment is not limited to these two patterns. For example, a pattern where the first to fourth states are randomly switched, such as a pattern where the state where the three graduations are turned off one by one from the state where all the three graduations are turned on is repeated, is also possible. As the display during replenishment, a configuration may be employed in which at least two out of the five states that are the first to fourth states illustrated in FIGS. 14 and 15 and an all-turned-off state where none of the graduations is turned on are repeatedly displayed. Consequently, it is possible to perform the display during replenishment corresponding to none of the above five states. Thus, it is possible to allow the user to visually recognize that toner is currently being supplied.

FIG. 18 is a flowchart illustrating control according to the present exemplary embodiment. In S61, if the user attaches the toner pack 40 to the attachment portion 57 to supply toner, then in S62, the control portion 90 determines whether a trigger for starting the replenishment is on. In the present exemplary embodiment, a detection portion (not illustrated) detects that the toner pack 40 is connected to the attachment portion 57, whereby the control portion 90 determines that the trigger is on. Then, if it is determined in S62 that the trigger is on (YES), then in S63, the control portion 90 starts the display during replenishment described above by switching the display of the toner remaining amount panel 400. On the other hand, if it is determined in S62 that the trigger is not on (NO), the determination in S62 is repeated until the trigger is on. While the user supplies toner, the display during replenishment is continued.

Then, in S64, it is determined whether the toner supply is completed. If it is determined that the toner supply is completed (YES), then in S65, the control portion 90 ends the display during replenishment by switching the display of the toner remaining amount panel 400. In the present exemplary embodiment, if the detection portion (not illustrated) detects release of the connection between the toner pack 40 and the attachment portion 57, the control portion 90 determines that the toner supply is completed. If it is determined in S64 that the toner supply is not completed (NO), the determination in S64 is repeated until the toner supply is completed. Then, in S66, the display of the toner remaining amount panel 400 is switched based on the detection result of the toner remaining amount sensor 51.

While the detection of the release of the connection between the toner pack 40 and the attachment portion 57 is used as the determination of whether the toner supply is completed in S64 in the present exemplary embodiment, the determination is not limited thereto. For example, the timing when the detection result of the toner remaining amount sensor 51 when toner is supplied is obtained may be used as the determination of whether the toner supply is completed. In this case, regardless of whether the user completes the release of the connection between the toner pack 40 and the attachment portion 57, the display during replenishment is ended at the timing when the detection result of the toner remaining amount sensor 51 is obtained, and then, the display of the toner remaining amount panel 400 is performed based on the detection result.

The determination of whether the toner supply is completed in S64 may be made coincident with the later one of timings when the release of the connection between the toner pack 40 and the attachment portion 57 is detected and when the detection result of the toner remaining amount sensor 51 as toner is supplied is obtained. Alternatively, as the determination of whether the toner supply is completed in S64, a timing a predetermined time after the detection of the remaining amount of toner ends may be used. A timing of an operation for closing the opening/closing member 83 or an operation performed by the user on the operation portion 300 may be used. The time for the detection of the remaining amount of toner somewhat depends on the amount of toner in the developing container 32. Thus, for example, if the detection of the remaining amount of toner ends sooner than the user ends the replenishment operation, the user may forget to perform an operation of detaching the toner pack depending on the situation. Thus, as the timing of ending the display during replenishment, a timing other than that of the detection of the remaining amount of toner described above may be used, whereby it is possible to prevent the user from forgetting to perform the operation of detaching the toner pack and from moving away from the image forming apparatus.

Figure 19:
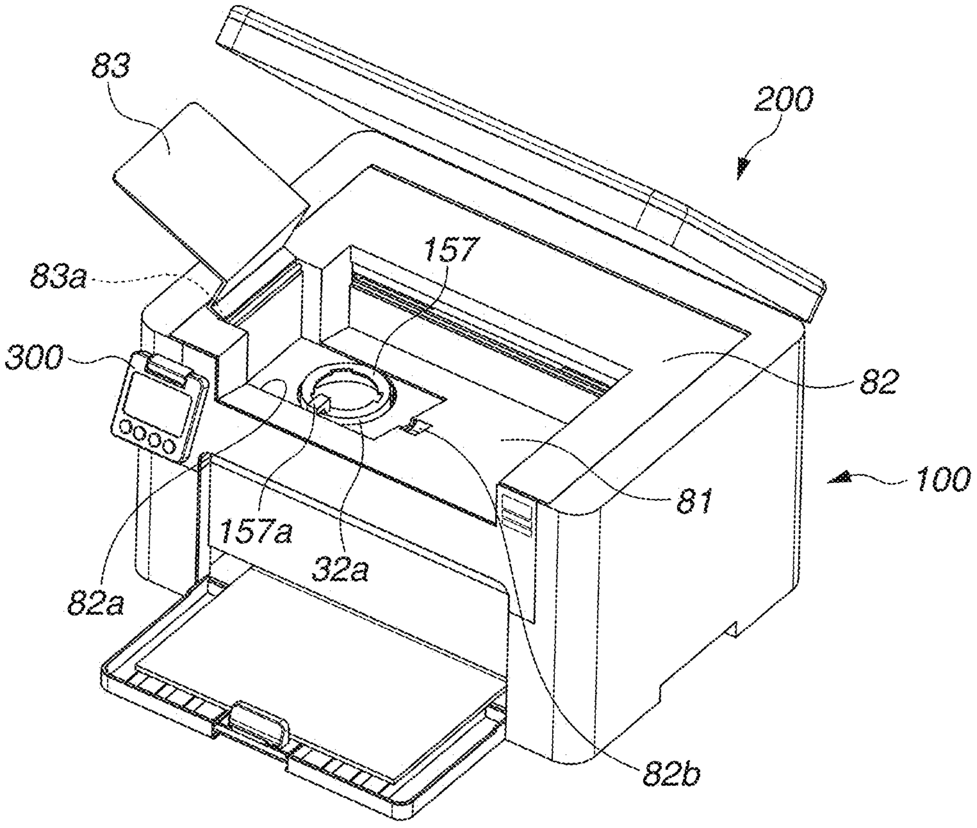
FIG. 19 is a schematic diagram illustrating a configuration of an image forming apparatus according to a modification.

FIG. 19 is a schematic diagram illustrating the configuration of an image forming apparatus 1 according to a modification of the present exemplary embodiment. In the first to third exemplary embodiments, the configurations have been described in which the toner pack 40 is attached to the attachment portion 57 and the toner pack 40 is rotated, thereby toner is supplied. The configuration, however, is not limited thereto. As illustrated in FIG. 19, a configuration may be employed in which a lever portion 157*a* is provided in an attachment portion 157, and after the toner pack 40 is attached to the attachment portion 157, the lever portion 157*a* is rotated, thereby the shutter member 41 is moved from the closed position to the opened position to supply toner. In this case, as the determination of whether the trigger is on in S62 in FIG. 18 according to the present exemplary embodiment, the rotation of the lever portion 157*a* may be used. Specifically, a lever sensor (not illustrated) is provided that detects at which of the opened position and the closed position the lever portion 157*a* is. Then, a state where the sensor detects that the lever portion 157*a* moves from the closed position to the opened position may be used in S62 in FIG. 18. As the determination of whether the toner supply is completed in S64, an operation of rotating the lever portion 157*a* to return the lever portion 157*a* to the position before the toner pack 40 is attached may be used. Specifically, a state where the lever sensor detects that the lever portion 157*a* moves from the opened position to the closed position may be used in S64 in FIG. 18. Also in the configuration according to the modification, as the determination of whether the toner supply is completed in S64, various timings as described above can be used in combination.

While the present exemplary embodiment has been described above with reference to the first exemplary embodiment, the invention according to the present exemplary embodiment may not be premised on the first exemplary embodiment. When the user supplies toner, the display during replenishment described in the present exemplary embodiment is performed, whereby it is possible to improve the visibility of the toner supply status for the user.

[Others]

Figure 20A:
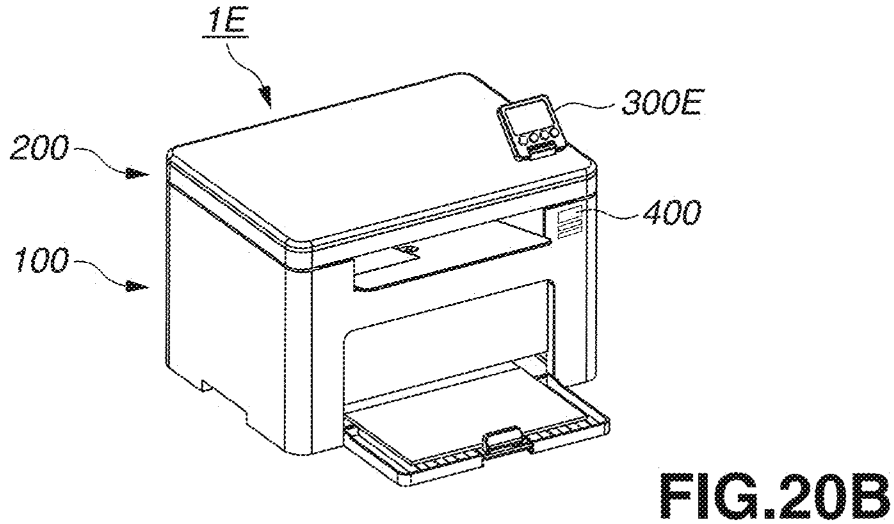
FIG. 20A is a perspective view illustrating another exemplary embodiment of the image forming apparatus.
Figure 20B:
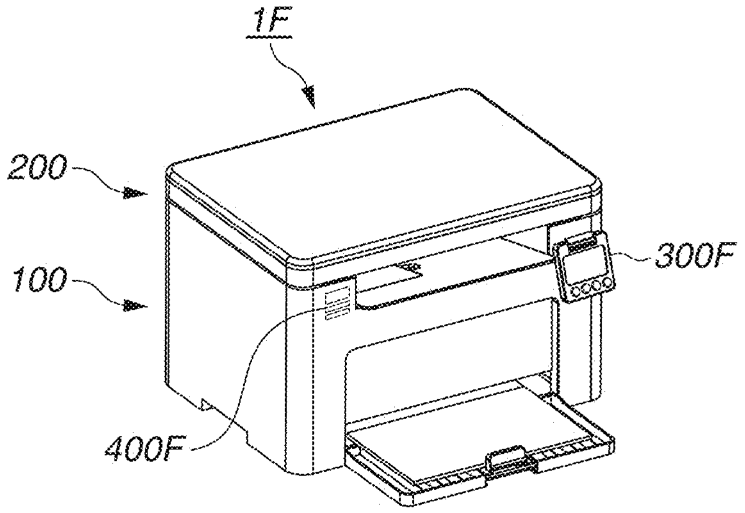
FIG. 20B is a perspective view illustrating the other exemplary embodiment of the image forming apparatus.
Figure 20C:
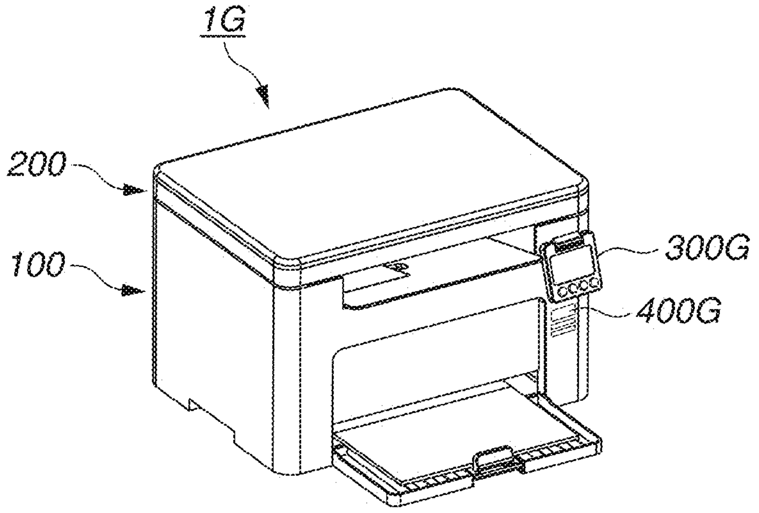
FIG. 20C is a perspective view illustrating the other exemplary embodiment of the image forming apparatus.

As illustrated in FIG. 20A, an operation portion 300E may be placed not in the printer main body 100 but in the reading device 200, or may be placed on the right side of the apparatus together with the toner remaining amount panel 400. As a matter of course, both the operation portion 300E and the toner remaining amount panel 400 may be placed on the right side of the apparatus. Alternatively, as illustrated in FIG. 20B, a toner remaining amount panel 400F may be placed on the left side of the apparatus, and an operation portion 300F may be placed on the right side of the apparatus. Alternatively, as illustrated in FIG. 20C, an operation portion 300G may be provided in the printer main body 100, and a toner remaining amount panel 400G and the operation portion 300G may be placed on the same side of the apparatus.

While the reading device 200 is provided above the printer main body 100 in any of the above embodiments, the image forming apparatus is not limited to this. More specifically, the image forming apparatus may be a printer without the reading device. The reading device may be a reading device including an auto document feeder (ADF) that feeds a document.

Fourth Exemplary Embodiment

[Toner Supply Process]

<Display of Toner Remaining Amount Panel>

Now, a description is given of the switching of the display of the toner remaining amount panel 400 when toner is consumed and when toner is supplied according to the present exemplary embodiment. The operations and the configurations of the image forming apparatus are substantially the same as those in the first exemplary embodiment. Thus, in the following description, the configurations and operations in common with those in the first exemplary embodiment are designated by the same signs, and are not described.

Figure 21:
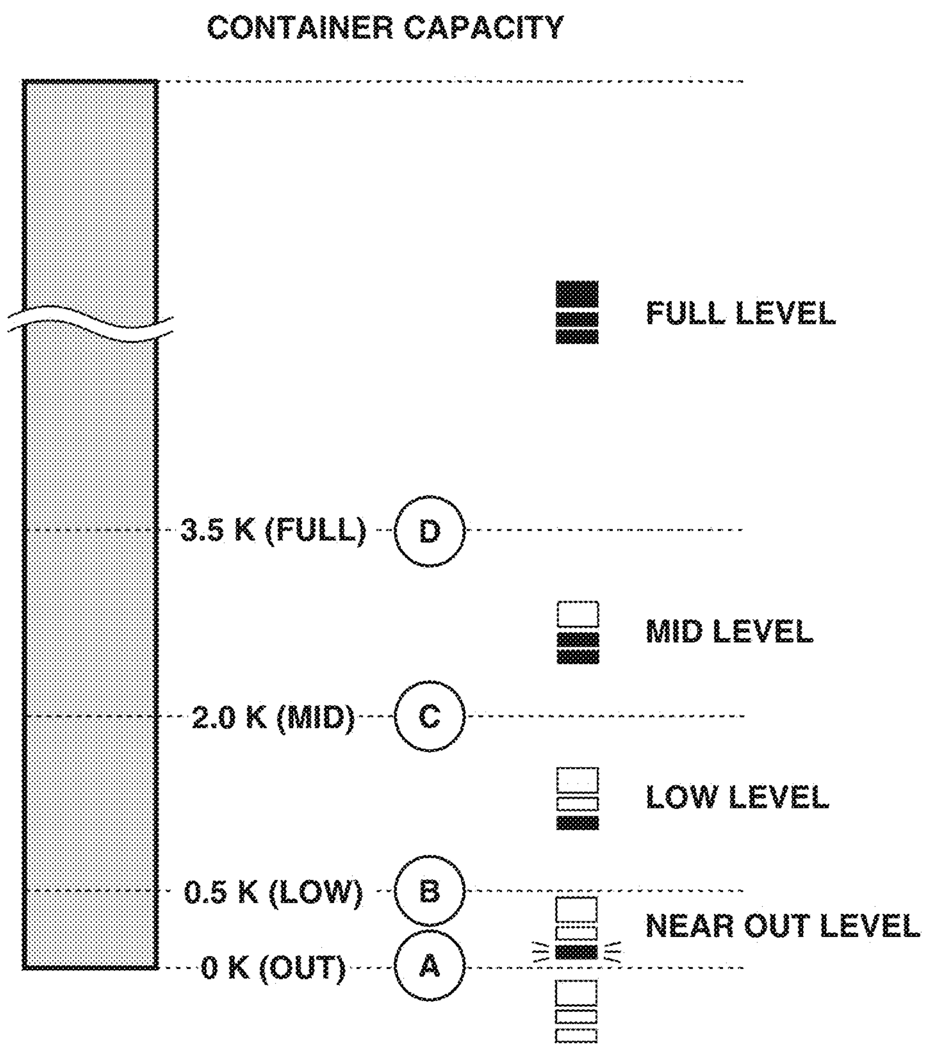
FIG. 21 is a graph illustrating a relationship between a capacity of a developing container and a level of the remaining amount of toner according to a fourth exemplary embodiment.

FIG. 21 is a schematic diagram illustrating thresholds for switching the display of the toner remaining amount panel 400 depending on the remaining amount of toner in the developing container 32 and the display patterns of the toner remaining amount panel 400.

As illustrated in FIG. 21, if toner in the developing container 32 is consumed by the image forming operation, the display of the toner remaining amount panel 400 is switched based on a detection result of the toner remaining amount sensor 51 described above. Specifically, if the detection result of the remaining amount of toner in the developing container 32 by the toner remaining amount sensor 51 is greater than or equal to a threshold D (a first threshold), the control portion 90 sets the display of the toner remaining amount panel 400 to the first state which indicates the full level and where all the three graduations are turned on. If the detection result of the remaining amount of toner in the developing container 32 by the toner remaining amount sensor 51 is less than the threshold D as toner is consumed, the control portion 90 sets the display of the toner remaining amount panel 400 to the second state which indicates the mid level and where the two graduations are turned on. In the present exemplary embodiment, the value of the threshold D is set to 3.5 K. Various thresholds described below including the threshold D may be appropriately set depending on the volume of toner to be supplied or various configurations of the image forming apparatus.

If the detection result of the remaining amount of toner in the developing container 32 by the toner remaining amount sensor 51 is less than a threshold C (a second threshold) as toner is consumed, the control portion 90 sets the display of the toner remaining amount panel 400 to the third state which indicates the low level and where one graduation is turned on. In the present exemplary embodiment, the value of the threshold C is set to 2.0 K. If the detection result of the remaining amount of toner in the developing container 32 by the toner remaining amount sensor 51 is less than a threshold B (0.5 K in the present exemplary embodiment), the control portion 90 sets the display of the toner remaining amount panel 400 to the fourth state which indicates the near out level and where one lowest graduation blinks. Then, if the detection result of the remaining amount of toner in the developing container 32 by the toner remaining amount sensor 51 is less than a threshold A (0 K in the present exemplary embodiment), the control portion 90 determines that toner in the developing container 32 has run out, and then sets the display to the state where all the three graduations are turned off.

More specifically, if the detection result of the toner remaining amount sensor 51 is between 2.0 K and 3.5 K, the control portion 90 sets the display of the toner remaining amount panel 400 to the second state. If the detection result of the toner remaining amount sensor 51 is between 0.5 K and 2.0 K, the control portion 90 sets the display of the toner remaining amount panel 400 to the third state. If the detection result of the toner remaining amount sensor 51 is between 0 K and 0.5 K, the control portion 90 sets the display of the toner remaining amount panel 400 to the fourth state. If it is determined that there is no remaining amount of toner, the control portion 90 sets the display to the state where all the graduations are turned off.

While the thresholds and the display of the toner remaining amount panel 400 when toner is consumed have been described above, the display of the toner remaining amount panel 400 is switched based on the thresholds described with reference to FIG. 21 also when toner is supplied. More specifically, the graduations are turned on based on the detection result of the toner remaining amount sensor 51 when toner is supplied.

The interval (the difference) between the threshold D (the amount of toner corresponding to the threshold D) and the threshold C (the amount of toner corresponding to the threshold C), i.e., the interval (the difference) between thresholds (the amounts of toner corresponding to the thresholds) related to the switching of the display of the top graduation, according to the present exemplary embodiment is set to be less than the amount of supply corresponding to one toner pack 40. Similarly, the interval (the difference) between the threshold C (the amount of toner corresponding to the threshold C) and the threshold A (the amount of toner corresponding to the threshold A), i.e., the interval (the difference) between thresholds (the amounts of toner corresponding to the thresholds) related to the switching of the display of the middle graduation, according to the present exemplary embodiment is also set to be less than the amount of supply corresponding to one toner pack 40. The amount of supply corresponding to one toner pack 40 is the same as the amount of toner stored in the toner pack 40 in an unused state.

The reason for this is described in detail below.

In a case where the interval between the thresholds corresponding to the switching of the display of one graduation is set to a value greater than the amount of supply corresponding to one toner pack 40, and when the user supplies toner using the toner pack 40, the display of the toner remaining amount panel 400 may not change. In this case, the display of the toner remaining amount panel 400 does not change even though the user supplies an amount corresponding to one toner pack 40. Thus, it is difficult to identify whether the replenishment is successful.

If the method for detecting the remaining amount of toner by the toner remaining amount sensor 51 is used, a slight error in detection may occur between the remaining amount of toner in the developing container 32 and the detection result although the error is set within an acceptable range of each apparatus. Further, in the toner supply configuration according to the present exemplary embodiment, since the user supplies toner using the toner pack 40, an error in replenishment, e.g., an actual amount of supply is smaller than an assumed amount of supply, may occur depending on handling thereof by the user. If the detection is influenced by these errors, the display of the toner remaining amount panel 400 may not switch even though the user has supplied toner, whereby it may be difficult for the user to identify whether the supply of toner is successful.

Accordingly, in the present exemplary embodiment, the interval between the thresholds corresponding to the switching of the display of one graduation is set to be less than the amount of supply corresponding to one toner pack 40. Consequently, even if the detection is influenced by the error in detection by the toner remaining amount sensor 51 or the error in handling when toner is supplied by the user, it is possible to appropriately switch the display of the toner remaining amount panel 400 when toner is supplied by the user. As a result, it is possible to notify the user that the toner is appropriately supplied. Thus, it is possible to improve the visibility of the toner supply status.

In a case where the interval (the difference) between the thresholds related to the switching of the display of a single graduation is set to be smaller than the amount of supply corresponding to one toner pack 40, and if the setting range of the interval between the thresholds is set to be too small, the following concern arises. For example, if thresholds having a range less than or equal to a half of one toner pack 40 are set and when one toner pack 40 is supplied, two graduations in the display of the toner remaining amount panel 400 may be turned on. From a viewpoint of the visibility of the supply status for the user, it is desirable that the replenishment with one toner pack 40 correspond to one graduation. Thus, the interval between the thresholds related to the switching of the display of one graduation is set to be less than the amount of supply corresponding to one toner pack 40 and greater than or equal to a half of the amount of supply corresponding to one toner pack 40. To obtain the effect of the present exemplary embodiment, however, it is only necessary to at least set the interval between the thresholds related to the switching of the display of one graduation to be less than the amount of supply corresponding to one toner pack 40, and it is not essential to set the interval between the thresholds to be greater than or equal to a half of the amount of supply corresponding to one toner pack 40.

Fifth Exemplary Embodiment

Figure 22:
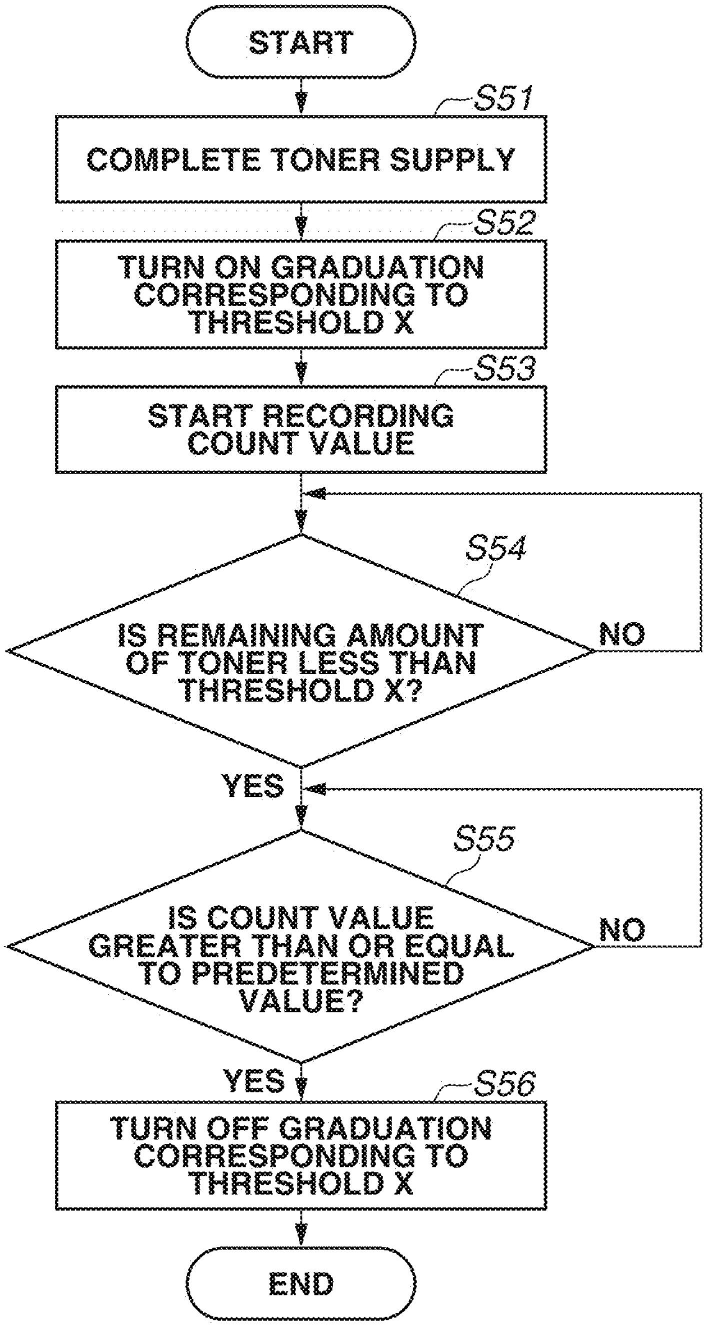
FIG. 22 is a flowchart illustrating a flow of control according to a fifth exemplary embodiment.

Now, with reference to FIG. 22, a fifth exemplary embodiment of the present invention is described. The fifth exemplary embodiment is different from the first exemplary embodiment in that the timing of the switching of the display of the toner remaining amount panel 400 after supply of toner is adjusted. Other operations and configurations of the image forming apparatus, however, are substantially the same as those in the first exemplary embodiment. Thus, in the following description, the configurations and operations in common with those in the first exemplary embodiment are designated by the same signs, and are not described.

As described in the first exemplary embodiment, if the supply of toner by the user is completed, the display of the toner remaining amount panel 400 switches after the detection by the toner remaining amount sensor 51 is made. At this time, if the toner is supplied to be in a range where the detection result comes out to be close to a threshold for switching the display, a graduation of the toner remaining amount panel 400 may switch immediately after the replenishment under the influence of the error in detection by the toner remaining amount sensor 51. For example, a description is given of a possible concern after the detection result of the toner remaining amount sensor 51 exceeds the threshold D' by supply of toner from the second state, and the display of the toner remaining amount panel 400 switches to the first state. In this case, depending on the error in detection by the toner remaining amount sensor 51, the detection result of the toner remaining amount sensor 51 becomes less than the threshold D shortly after the image forming operation is started, whereby the display of the toner remaining amount panel 400 switches to the second state.

Accordingly, in the present exemplary embodiment, based on image forming information in the image forming operation after toner is supplied, the timing of the switching of the display of the toner remaining amount panel 400 is controlled. FIG. 22 is a flowchart illustrating a flow of control according to the present exemplary embodiment.

As illustrated in FIG. 22, in S51, if the supply of toner by the user is completed, the display of the toner remaining amount panel 400 switches based on the detection result of the toner remaining amount sensor 51. A case is described where toner is supplied from the mid level, which is the second state. Thus, a threshold X illustrated in S52 refers to the threshold D'. By a sequence in S52, the top graduation is turned on, and the display of the toner remaining amount panel 400 switches from the second state to the first state. Then, when the supply of toner by the user is completed, as illustrated in S53, recording of a count value in a storage medium (not illustrated) built into the control portion 90 is started. In the present exemplary embodiment, the presence or absence of an image signal with respect to each pixel at a predetermined frequency that is obtained from an image signal regarding a formed image when image formation is performed is counted and recorded. Then, the count is accumulated every time image formation is performed.

Then, if toner in the developing container 32 is consumed in the image forming operation, then as illustrated in S54, the control portion 90 determines whether the detection result of the toner remaining amount sensor 51 is less than the threshold D. If the remaining amount of toner is below the threshold D in S54 (YES), then in S55, the control portion 90 determines whether the previously recorded count value is greater than or equal to a predetermined value. If the remaining amount of toner is not below the threshold D in S54 (NO), the detection of the remaining amount of toner is repeated at a predetermined timing until the remaining amount of toner is below the threshold D in S54.

If the count value is greater than or equal to the predetermined value in S55 (YES), then in S56, the control portion 90 turns off the graduation corresponding to the threshold D, i.e., switches the display of the toner remaining amount panel 400 from the first state to the second state. On the other hand, if the count value is less than the predetermined value in S55 (NO), the determination of the count value is repeated until the count value is greater than or equal to the predetermined value in S55. In the present exemplary embodiment, the predetermined value used in the determination in S55 is set to a value corresponding to the number of pixels in a case where a predetermined image is formed on 100 recording materials. However, the predetermined value is not limited thereto. The predetermined value used in the determination of the count value may be appropriately set depending on various configurations or control of the image forming apparatus.

Although the control is performed based on the count value of the result of counting the presence or absence of an image signal with respect to each pixel at the predetermined frequency in the present exemplary embodiment, the control is not limited thereto. For example, a configuration may be employed in which the counting of the accumulated number of recording materials on which image formation is performed is started in S53, and if the accumulated count value of recording materials is greater than or equal to a predetermined number in S55, the graduation corresponding to the threshold X is turned off, thereby the display of the toner remaining amount panel 400 is switched. As the counting of the presence or absence of an image signal with respect to each pixel, a method for counting based on an image signal emitted from an exposure device to the photosensitive drum 21 may be used, or a method for counting based on image information loaded into the control portion 90 in advance may be used.

The present invention is not limited to the above exemplary embodiments, and can be changed and modified in various ways without departing from the spirit and the scope of the present invention. Therefore, the following claims are appended to apprise the public of the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus that performs image formation for forming a toner image on a recording material, the image forming apparatus comprising:
- a photosensitive drum;
- a developing container configured to store toner, the developing container provided with a replenishment opening for toner supply from outside of the image forming apparatus;
- a developing roller configured to supply the toner stored in the developing container to the photosensitive drum;
- a detection portion configured to output a signal according to an amount of the toner stored in the developing container;
- a display portion configured to perform display; and
- a control portion configured to control the display portion,
- wherein the control portion controls the detection portion to execute, during the image formation, a first detection for obtaining, based on the signal of the detection portion, a first detection result, and to execute, during the toner supply, a second detection for obtaining, based on the signal of the detection portion, a second detection result,
- wherein the display portion,
- in a case where the first detection result is greater than or equal to a first threshold, displays a first display and, in a case where the first detection result is less than the first threshold, displays a second display different from the first display, and
- in a case where the second detection result is greater than or equal to a second threshold, displays the first display and, in a case where the second detection result is less than the second threshold, displays the second display, and
- wherein the second threshold is smaller than the first threshold.

2. The image forming apparatus according to claim 1,
- wherein the display portion includes a plurality of graduations each configured to be turned on or turned off depending on detection results of the detection portion including first and second detection results, and
- wherein the number of graduations that are turned on is greater in the first display than in the second display.

3. The image forming apparatus according to claim 2,
- wherein three graduations are provided, and
- wherein the first display is a display in which all three graduations are turned on, and the second display is a display in which two adjacent graduations among the three graduations are turned on.

4. The image forming apparatus according to claim 2,
- wherein the graduations include a first graduation and a second graduation different from the first graduation, the first display is a display in which the first and second graduations are turned on, and the second display is a display in which either one of the first and second graduations is turned on, and
- wherein, while toner is supplied through the replenishment opening to the developing container, the display portion repeatedly displays at least two of the following three displays:
- the first display;
- the second display; and
- a third display in which the first and second graduations are turned off.

5. The image forming apparatus according to claim 1, wherein, in a case where the image formation is started after a display based on the second detection result is performed, the display portion is controlled to continue the display based on the second detection result until a predetermined condition is satisfied, and based on satisfaction of the predetermined condition, the display based on the second detection result is switched to a display based on the first detection result.

6. The image forming apparatus according to claim 5, wherein the predetermined condition is that a count value obtained by accumulating the number of pixels in image data for which toner is consumed reaches a predetermined count value.

7. The image forming apparatus according to claim 5, wherein the predetermined condition is that the number of recording materials on which the image formation is performed reaches a predetermined number.

8. An image forming apparatus to which a toner container is detachably attached and which performs image formation for forming a toner image on a recording material, the image forming apparatus comprising:

a photosensitive drum;

a developing container configured to store toner, the developing container provided with a replenishment opening through which the toner is supplied from the toner container to the developing container;

a developing roller configured to supply the toner stored in the developing container to the photosensitive drum;

a detection portion configured to output a signal according to an amount of the toner stored in the developing container;

a display portion; and a control portion configured to control the display portion, wherein the control portion controls the detection portion to execute, during the image formation, a first detection for obtaining, based on the signal of the detection portion, a first detection result, and to execute, during the toner supply, a second detection for obtaining, based on the signal of the detection portion, a second detection result, wherein the control portion controls the display portion to perform a first display and a second display different from the first display depending on detection results of the detection portion including first and second detection results, and wherein the amount of the toner at a timing of switching from the second display to the first display in the display portion during the toner supply is smaller than the amount of the toner at a timing of switching from the first display to the second display during the image formation.

9. An image forming system that performs image formation for forming a toner image on a recording material, the image forming system comprising:

a toner container configured to store toner; and an image forming apparatus to which the toner container can be attached, the image forming apparatus including:

an attachment portion to which the toner container can be attached;

a photosensitive drum;

a developing container configured to store toner, the developing container provided with a replenishment opening for receiving toner supply from the toner container attached to the attachment portion;

a developing roller configured to supply the toner stored in the developing container to the photosensitive drum;

a detection portion configured to output a signal according to an amount of the toner stored in the developing container;

a display portion configured to perform display depending on a detection result of the detection portion; and a control portion configured to control the display portion, wherein the display portion is controlled to, in a case where the detection result is greater than or equal to a first threshold, display a first display, and in a case where the detection result is less than the first threshold and greater than or equal to a second threshold smaller than the first threshold, display a second display different from the first display, and wherein a difference between the amount of toner corresponding to the first threshold and the amount of toner corresponding to the second threshold is less than the total amount of toner stored in the toner container in an unused state.

10. The image forming system according to claim 9, wherein the display portion includes a plurality of graduations each configured to be turned on or turned off depending on the detection result, and wherein the number of graduations that are turned on is greater in the first display than in the second display.

11. The image forming system according to claim 10, wherein three graduations are provided, and wherein the first display is a display in which all three graduations are turned on, and the second display is a display in which two adjacent graduations among the three graduations are turned on.

12. The image forming system according to claim 10, wherein the graduations include a first graduation and a second graduation different from the first graduation, the first display is a display in which the first and second graduations are turned on, and the second display is a display in which either one of the first and second graduations is turned on, and wherein, while toner is supplied from the toner container to the developing container through the replenishment opening, the display portion repeatedly displays at least two of the following three displays:

the first display;

the second display; and a third display in which the first and second graduations are turned off.

* * * * *